(12) United States Patent
Lawrence

(10) Patent No.: US 10,621,535 B1
(45) Date of Patent: Apr. 14, 2020

(54) METHOD AND APPARATUS TO ONBOARD RESOURCES

(71) Applicant: Mark Lawrence, Monrovia, CA (US)

(72) Inventor: Mark Lawrence, Monrovia, CA (US)

(*) Notice: Subject to any disclaimer, the term of this patent is extended or adjusted under 35 U.S.C. 154(b) by 847 days.

(21) Appl. No.: 15/089,553

(22) Filed: Apr. 3, 2016

Related U.S. Application Data

(60) Provisional application No. 62/152,819, filed on Apr. 24, 2015.

(51) Int. Cl.
*G06Q 10/00* (2012.01)
*G06Q 10/06* (2012.01)
*G06Q 10/10* (2012.01)

(52) U.S. Cl.
CPC ... *G06Q 10/06393* (2013.01); *G06Q 10/1053* (2013.01)

(58) Field of Classification Search
None
See application file for complete search history.

(56) References Cited

U.S. PATENT DOCUMENTS

| | | | |
|---|---|---|---|
| 5,551,880 A | 9/1996 | Bonnstetter | |
| 7,233,931 B2 | 6/2007 | Lee | |
| 7,562,059 B2 | 7/2009 | Scarborough et al. | |
| 7,562,063 B1 | 7/2009 | Chaturvedi | |
| 7,606,778 B2* | 10/2009 | Dewar | G06Q 10/063112 706/21 |
| 7,650,266 B2 | 1/2010 | Obeid | |
| 7,660,705 B1 | 2/2010 | Meek et al. | |
| 7,778,938 B2 | 8/2010 | Stimac | |
| 7,853,550 B1 | 12/2010 | Chaturvedi | |
| 7,949,552 B2* | 5/2011 | Korenblit | G06Q 10/06 705/7.13 |
| 7,966,265 B2* | 6/2011 | Schalk | G06Q 10/10 705/319 |
| 8,015,142 B1 | 9/2011 | Chaturvedi | |
| 8,046,251 B2 | 10/2011 | Scarborough et al. | |

(Continued)

FOREIGN PATENT DOCUMENTS

| | | |
|---|---|---|
| WO | WO2001097083 A1 | 12/2001 |
| WO | WO2001097083 A1 | 11/2006 |

(Continued)

OTHER PUBLICATIONS

Shetrone, April, 7 Ways to Improve Employee Satisfaction, May 18, 2011, Inc.com, https://www.inc.com/guides/201105/7-ways-to-improve-employee-satisfaction.html, p. 1-9.*

(Continued)

*Primary Examiner* — Joseph M Waesco

(57) ABSTRACT

The present invention is a method and apparatus that enables client organizations to reach the best job candidates, even those who are not searching for a job, and provide self-service questionnaires that prescreen unqualified candidates; uses self-service questionnaires that measure a combination of skills and abilities that predict job performance; uses structured interviews as a fair and repeatable input to the candidate selection process; and uses employee performance assessments to provide feedback that will continuously improve structured interviews and also improve the pre-screening process.

20 Claims, 19 Drawing Sheets

(56) References Cited

U.S. PATENT DOCUMENTS

| | | | |
|---|---|---|---|
| 8,073,731 B1* | 12/2011 | Rajasenan | G06Q 10/0637 705/7.42 |
| 8,086,558 B2* | 12/2011 | Dewar | G06Q 10/063112 706/62 |
| 8,200,527 B1* | 6/2012 | Thompson | G06Q 10/0639 705/7.39 |
| 8,265,977 B2 | 9/2012 | Scarborough et al. | |
| 8,311,863 B1* | 11/2012 | Kemp | G06Q 10/0639 705/7.11 |
| 8,407,081 B1* | 3/2013 | Rajasenan | G06Q 10/0637 705/7.42 |
| 8,429,101 B2 | 4/2013 | Wilson | |
| 8,682,683 B2 | 3/2014 | Ananian | |
| 9,720,707 B1* | 8/2017 | Shook | G06F 9/451 |
| 9,760,601 B2* | 9/2017 | Burke | G06Q 10/00 |
| 2002/0045154 A1* | 4/2002 | Wood | G06Q 30/02 434/350 |
| 2002/0143573 A1 | 4/2002 | Bryce | |
| 2009/0043621 A1* | 2/2009 | Kershaw | G06Q 10/06 705/7.16 |
| 2009/0319344 A1* | 12/2009 | Tepper | G06Q 10/06393 705/7.39 |
| 2011/0055098 A1* | 3/2011 | Stewart | G06Q 10/00 705/321 |
| 2011/0251978 A1* | 10/2011 | Davies | G06Q 40/00 705/36 R |
| 2011/0270780 A1* | 11/2011 | Davies | G06Q 40/06 705/36 R |
| 2012/0290365 A1 | 11/2012 | Bramlett et al. | |
| 2013/0124268 A1* | 5/2013 | Hatton | G06Q 10/063112 705/7.38 |
| 2014/0156308 A1* | 6/2014 | Ohnemus | G06F 19/3418 705/3 |
| 2014/0162240 A1* | 6/2014 | Wheeler | G09B 7/00 434/362 |
| 2014/0164290 A1* | 6/2014 | Salter | G06Q 40/06 705/36 R |
| 2015/0134694 A1* | 5/2015 | Burke | G06Q 10/00 707/769 |
| 2015/0347950 A1* | 12/2015 | Goyal | G06Q 10/06393 705/7.39 |
| 2016/0225039 A1* | 8/2016 | Hayden | G06Q 30/0282 |
| 2016/0260044 A1* | 9/2016 | Sabet | G06Q 10/06398 |
| 2016/0275434 A1* | 9/2016 | Briganti | G06Q 10/06398 |

FOREIGN PATENT DOCUMENTS

| | | |
|---|---|---|
| WO | WO2013156828 | 10/2013 |
| WO | WO2013156828 A1 | 10/2013 |

OTHER PUBLICATIONS

Bauer, Onboarding New Employees:Maximizing Success, SHRM Foundation's Effective Practice Guidelines Series.

Wiesnert and Cronshaw, A meta-analytic investigation of the impact of interview format and degree of structure on the validity of the employrnent interview, Journal of Occupational Psychology, 1988, 61, 275-290. Printed in Great Britain.

PrimeGenesis, Heidrick and Struggles study of 20,000 searches highlights need for onboarding improvements.

Staffing Advisors, Consistent Hiring Part Two Recruiting Top Performers.

Schmidt and Hunter, The Validity and Utility of Selection Methods in Personnel Psychology: Practical and Theoretical Implications of 85 Years of Research Findings, Psychological Bulletin 1998, vol. 124, No. 2, 262-274.

Public Management, Leadership IQ Study: Why New Hires Fail, Mar. 2006 • vol. 88 • No. 2.

* cited by examiner

207 Data Storage System

- 601 CCS Database
- 602 Organization Database
- 603 Resource Database
- 604 Prompt Database
- 605 Category Database
- 606 Questionnaire Database
- 607 Activity Database
- 608 Notification Database
- 609 Administration Database
- 610 Workflow Management Database
- 611 Document Management Database
- 612 Payment Processor Database
- 613 Audit Database
- 614 User Database

Fig. 6

| | |
|---|---|
| 1401 | Save |
| 1402 | Cancel |

| Field | Value |
|---|---|
| Help | 1403 |
| Prompt | 1404 |
| Action | 1405 |
| Multiple Choice | 1406 ☐ |
| | 1408 Add  1409 Delete |
| Input Default | 1407 |
| Next Question | 1410 |
| Category | 1411 |
| Time-to-Respond (Mins) | 1412 |
| Role | 1413 |
| Levels | 1414 |
| Functional | 1415 |
| Industry | 1416 |
| Other #1 | 1417 |
| Other #2 | 1418 |
| Weight | 1419 |
| Availability Start Date | 1420 |
| End Date | 1421 |

Fig. 14

| | | |
|---|---|---|
| Organization<br>1701 | Department<br>1702 | Job Position<br>1703 |
| Hiring Manager<br>1704 | Interviewers<br>1705 | Interview Date<br>1706 |
| Interviewee<br>1707 | Available<br>1708 | Location<br>1709 |
| Resume<br>1710 | Education<br>1711 | Certification<br>1412 |

| Category | Target | Score | Weight | Comments |
|---|---|---|---|---|
| Category #1 | 1713 | 1714 | 1715 | 1716 |
| Category #2 | 1717 | 1718 | 1719 | 1720 |
| Category #3 | 1721 | 1722 | 1723 | 1724 |
| Total | 1725 | 1726 | 1728 | 1729 |

| Recommendation | On Board | Follow Up | Pass |
|---|---|---|---|
| 1730 | 1731 | 1732 | 1733 |

Fig. 17

METHOD AND APPARATUS TO ONBOARD RESOURCES

CROSS REFERENCE TO RELATED APPLICATION

This application claims the benefit of provisional patent application Ser. No. 62/152,819 filed 2015 Apr. 24 by the present inventor.

This application is related to the following commonly-owned U.S. Patent Applications; Provisional Patent Application 60/140,479 (Jun. 22, 1999), Provisional Patent Application 60/216,767 (Jun. 7, 2000) application Ser. No. 09/599,673 (Jun. 22, 2000), application No. 10/716,847 (Nov. 18, 2003), Provisional Patent Application 61/315,977 (Mar. 21, 2010), Provisional Patent Application 61/327,720 (Apr. 26, 2010), Provisional Patent Application 61,301,431 (Jul 5, 2010), patent application Ser. No. 13/046,775 (Mar. 14, 2011), Utility Patent U.S. Pat. No. 8,527,327 and Utility Patent U.S. Pat. No. 8,548,868.

This application is also related to the following commonly-owned International Patent Applications; WO 00/79350 (Dec. 28, 2000), WO 02/05138 (Jan. 17, 2002), and PCT/US00/17247 (Jun. 22, 2000).

The workflow management system taught herein is a part of the present Invention and is a new use of the Process Automation Software taught in application Ser. No. 10/716,474 (Nov. 18, 2003).

FEDERALLY SPONSORED RESEARCH

None.

SEQUENCE LISTING

None.

BACKGROUND OF THE PRESENT INVENTION

1.1) Field of the Invention

This invention relates generally to the field of resource onboarding.

1.2) Background

In this disclosure, a Prompt is defined as a statement or question. The goal of a Prompt is to elicit a response that will help determine if a potential solution, such as a job candidate, matches a potential opportunity, such as a job.

In this disclosure, a Category is defined as a key success attribute that impacts the match between a potential solution and a potential opportunity. An example of a key success attribute is a key skill for a job candidate.

In this disclosure, a Questionnaire is defined as a sequence of Categories that are comprised of a sequence a prompts. The goal of a Questionnaire is to measure how a potential solution matches a potential opportunity on multiple dimensions.

In this disclosure, an Activity is defined as an event where a Questionnaire is executed, such as a job interview.

In this disclosure, a Weight is defined as a factor that is used to express the relative importance of Prompts within Categories, Categories within Questionnaires and Questionnaires within Activities.

In this disclosure, a Resource is defined as an asset that facilitates an Activity. Resources include people, tools and techniques, such as interviews, interviewees, computing devices, and interview policies and procedures.

The traditional recruiting process executed by many organizations is extremely ineffective. According to Kevin Kelly, the CEO of global executive search firm Heidrick & Struggles "40 percent of executives hired at the senior level are pushed out, fail or quit within 18 months". According to recent data referenced by the Society for Human Resource Management: 50% of all hourly workers leave their new positions within 120 days of hire. 50% of all externally hired senior managers leave within the first 18 months. The recruiting process has a high failure rate at the associate, manager and executive levels.

According to a study by Leadership IQ, 46% of newly hired employees will fail within 18 months, while only 19% will achieve unequivocal success. According to CMI Perspective National estimates, a typical organization has an annual turnover rate of 10%-20%. Moreover, replacing an employee costs between one and three times the existing employee's salary. For an organization that has 100 employees and an average salary of $50,000, the annual cost for staff turnover is $1.5 M. In addition, studies have shown that behavioral interviewing programs can reduce turnover by up to 45% which, in the above example, would save $675,000 per year.

The failure effects of the hiring process are represented by the high turnover rates that organizations observe for new hires. However, substantial research has also been conducted to determine the main failure modes of the hiring process.

In fact, hiring is difficult because the prevailing hiring process has so many unmitigated failure modes. According to StaffingAdvisors.com, to make a successful hire, organizations must succeed at all critical tasks in the recruiting process. Organizations must understand the success criteria for a role and the competencies required for a candidate to succeed. Then the hiring organization needs access to an appropriate pool of qualified candidates and must make an attractive offer. Then the organization must encourage the right candidates to apply and they must evaluate these candidates based on criteria that will correctly predict job performance. Then the preferred candidate must accept and the organization must onboard him or her effectively. The onboarded worker must then perform as expected before organizational priorities and needs change. This is a low probability undertaking that requires a high quality end-to-end process that mitigates the large number of failure modes and increases the probability of high performing new hires.

To improve the hiring process, it is necessary to understand the skills, abilities and attributes that predict hiring success. Research conducted by Frank Schmidt and John Hunter in the Psychological Bulletin in 1998 presents the validity of 19 selection procedures that correlate with effective job performance. Moreover, the predictability of job performance can be enhanced by combining the most valid selection procedures. Overall, the 3 combinations with the highest multivariate validity and utility for job performance were general mental ability ("GMA") plus a work sample test (mean validity of 0.63), general mental ability plus an integrity test (mean validity of 0.65), and general mental ability plus a structured interview (mean validity of 0.63). The validity coefficient is an indicator of how strongly the individual selection process is linked to job performance. The top 10 of 19 predictors of job performance are 1. Work sample tests (0.54); 2. GMA tests . . . "General mental ability" (0.51); 3. Employment interviews—structured (0.51); 4. Peer ratings (0.49); 5. Job knowledge tests (0.48); 6. Past behavior consistency methods (0.45); 7. Job trial procedures (0.44); 8. Integrity/honesty tests (0.41); 9. Employment interviews—unstructured (0.38); and 10. Assessment centers (0.37). Organizations can maximize success by hiring someone smart and seeing if they can do the work (e.g., GMA plus a work sample test) or by hiring someone smart and conducting an integrity test or by hiring someone smart and conducting a structured interview.

According to Mark Murphy from Leadership IQ, 82% of managers reported that in hindsight, their interview process with these employees elicited subtle clues that they would be headed for trouble. But during the interviews, managers were too focused on other issues, too pressed for time, or lacked confidence in their interviewing abilities to heed the warning signs. This is indicative of a flawed interviewing process.

According to Staffing Advisors, close to 80% of job seekers rely on online recruiting as their primary search strategy, but, ineffective job descriptions attract candidates who are looking for work rather than grabbing the attention of achievement-oriented top performers. If the initial pool of candidates is flawed then the result is almost guaranteed to be flawed. This is compounded by the fact that it is so easy for any applicant, especially unqualified applicants, to submit an unqualified resume by simply clicking the enter button on their keyboard. An effective prescreening process is essential.

These and other challenges in the end-to-end hiring process are not resolved by the prior art. U.S. Pat. No. 8,682,683 B2 teaches an automated pre-screening interview that sends application portfolios, that pass a predetermined set of fulfillment criteria, to a candidate queue. US 20020143573 A1 teaches a system that permits a recruiter to post a detailed job posting, receives job seeker applications, ranks and sorts candidates according to skills and qualifications, automatically queries job seeker references, communicates recruiter questions to job seekers and receives responses, including audio and video, provides the recruiter with a package of the information collected, and automated tools for scheduling interviews. U.S. Pat. No. 7,650,286 B1 teaches a system that matches resumes to job descriptions. A resume is a match when it includes the required skill or experience-related phrase for each job requirement and the term of experience for the required skill or experience-related phrase in the resume is greater than or equal to the required term of experience. U.S. Pat. No. 7,778,938 B2 teaches a system that allows a job applicant to answer a series of predetermined job related profile questions, providing a numeral score associated with each response, and tabulating the total score for all responses so that each job applicant can be objectively compared to other job applicants.

U.S. Pat. No. 5,551,880 A teaches a system for predicting potential of success of an individual for a particular job or task using structured interviews. WO 2013156828 A1 teaches a system that transmits interview questions to the subject; receiving subject videos from the subject, each one of the subject videos comprising an answer to a respective interview question. EP 1299520 A4 teaches a system for testing and/or evaluating employees or potential employees. The performance evaluation of hired workers may be fed back to the computer for adjusting the system and method. Competencies shown to be predictive of successful performance of a given type of job are tested for at various stages in an online testing system.

US 20120290355 A1 teaches a performance model that uses a neural network of personal traits and performance traits that determine whether a particular person is likely to be a top performer in an occupation. U.S. Pat. No. 7,562,059 B2, U.S. Pat. No. 8,046,251 B2 and U.S. Pat. No. 8,265,977 B2 teach a system that enables pre-hire and post-hire information to be collected electronically and used to build an artificial-intelligence based model. The model can then be used to predict a desired job performance criterion for new applicants. Pre-hire information identified as ineffective can be removed and new items can be added and their effectiveness tested. As a result, a system can exhibit adaptive learning and maintain or increase effectiveness even under changing conditions.

However, none of these disclosures, or any other prior art, teaches an end-to-end system that encourages the best candidates to apply for an opportunity even those who are not searching for a job; prescreens unqualified candidates automatically; further prescreens candidates automatically for skills and abilities that are highly predictive of job performance including general mental ability, job knowledge, integrity, honesty, and conscientiousness; uses structured interviews to measure skills and abilities that predict job performance with minimal time-of-interview preparation by busy interviewers; measures the actual performance of onboarded candidates; leverages actual performance to improve prescreening and structured interviews; and documents results at key steps in the process to increase the legal defensibility of a client organization's hiring and promotion program.

Accordingly, there is a need for a system that attracts preferred candidates, combines multiple selection procedures for predicting job performance and is easy to use for line managers and line workers who will often be pressed for time just before interviews. An end-to-end solution is required that improves the process from attracting and pre-screening the right candidates, to onboarding those candidates, measuring their actual performance, effecting a feedback mechanism for continuous improvement and documenting the key results in the process to meet legal guidelines.

The applicant is not aware of any other commercially viable system that addresses the shortcomings of the prior art and also includes the features stated above. It is therefore an object of the present invention to set forth a system that enables client organizations to reach the best candidates, even those who are not searching for a job, and provide self-service questionnaires that prescreens unqualified candidates; uses self-service questionnaires that measure a combination of skills and abilities that predict job performance; uses structured interviews as a fair and repeatable input to the candidate selection process; and uses employee performance assessments to provide feedback that will improve structured interviews and improve the prescreening process.

It is a further object of the present invention to enable unqualified candidates to be prescreened automatically without eliminating capable candidates.

It is another object of the present invention to measure, via self-service, the skills and abilities that predict job performance including general mental ability, job knowledge, integrity, honesty, and conscientiousness.

It is a further object of the present invention to use a structured interview process to extend the measurement of self-survey skills and abilities that predict job performance and measure additional skills and abilities that predict job performance including behavioral consistency as well as capturing interests, requesting reference checks and expecting the completion of work samples on site. The questions in the structured interviews are directly related to measureable skills, competencies, or past experiences-that are indicative of excellent job performance. According to a study by Wiesner, W. H., & Cronshaw, S. F. (1988). A meta-analytic investigation of the impact of interview format and degree of structure on the validity of the employment interview, a typical unstructured interview had a reliability of predicting job performance of approximately 15-30% compared with up to 87% for structured interviews.

It is another object of the present invention to use structured job performance assessments to measure the actual job performance of onboarded candidates and relate actual performance to the skills and abilities that were used to predict job performance during prescreening and structured job interviews.

It is a further object of the present invention to compare actual performance of onboarded candidates with predicted performance to improve the list of skills and abilities and their weights used to prescreen and select candidates.

It is another object of the present invention to generate prescreening summaries, interview summaries, performance assessment summaries and other process documentation that will increase the legal defensibility of a client organization's hiring and promotion program. According to CMI perspective, in federal equal employment litigation, objective and standardized measures make judgments for the defendant up to 11 times more likely than a judgment for the plaintiff.

It is a further object of the present invention to apply failure modes and effects techniques to the hiring process to improve the average success rate of new hires.

These and other objects of the present invention will be apparent to those skilled in the art from the following detailed description of the present invention, the accompanying drawings and the appended claims.

SUMMARY OF THE PRESENT INVENTION

In a preferred embodiment, the present invention provides a method and apparatus for organizations to:

Develop and maintain a database of prompts that include interview questions. The goal of the prompts is to elicit information to determine the potential match between a solution, such as an interviewee, and an opportunity, such as a job position.

Assign prompts to Categories that represent the key success characteristics of an opportunity, such as the skills required for a job candidate to succeed in a specific job.

Assign Categories to Questionnaires.

Assign Questionnaires to Activities, such as interviews.

Assign Weights to Questions, Categories and Questionnaires. The purpose of the Weights is to assign relative importance among Questions within Categories, among Categories within Questionnaires and among Questionnaires within Activities.

Schedule Activities, such as interviews.

Assign Resources to Activities, such as interviewers and interviewees.

Execute at least one first Questionnaire and score the responses. The purpose of the first Questionnaire is to attract high potential prospects particularly those who are not actively looking for a new job. This may be a self-service questionnaire that can be scored automatically that is accessible from a non-job related forum.

Execute at least one second Questionnaire and score the responses. The purpose of the second Questionnaire is to pre-filter Resources, such as interviewees. This may be a self-service questionnaire that can be scored automatically.

Execute at least one third Questionnaire and score the responses. The purpose of the third Questionnaire is to identify the best match between solution options and the opportunity, such as selecting the best candidate for a job.

Execute at least one fourth Questionnaire and score the responses. The purpose of the fourth Questionnaire is to measure the actual match between the selected solution option and the opportunity, such as the actual job performance of the onboarded candidate.

Generate reports that include information about key success characteristics of an opportunity, such as a weighted score for each skill required for a job candidate to succeed in a specific job. Reports can be generated after the completion of each first, second, third and fourth questionnaire.

Use reports from each fourth Questionnaire to improve the performance of the selected solution, such as the job performance of the selected job candidate. For example, measure the improvement of key skills and identify future needs for improvement.

Use reports from each fourth Questionnaire to improve the Categories, Questions, Scoring and weighting for each third Questionnaire, second Questionnaire and each first Questionnaire. For example, adjust skills expectation to better predict excellent job performance.

Use reports from each third Questionnaire to improve the Categories, Questions, Scoring and weighting for each second Questionnaire. For example, adjust skills expectation to better identify excellent job candidates.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 illustrates a first embodiment of the data storage system ("DSS") for the present invention.

FIG. 14 illustrates a first embodiment of the Prompt editing interface for the WMS of the present invention.

FIG. 17 illustrates a first embodiment of the assessment report for the present invention.

DETAILED DESCRIPTION OF THE INVENTION

With reference to the figures, exemplary diagrams of key components of the present invention are provided in which illustrative embodiments may be implemented. It should be appreciated that these figures are only exemplary and are not intended to assert or imply any limitation with regard to the components in which different embodiments may be implemented. Many modifications to the depicted components may be made.

System Overview

Figure 1:
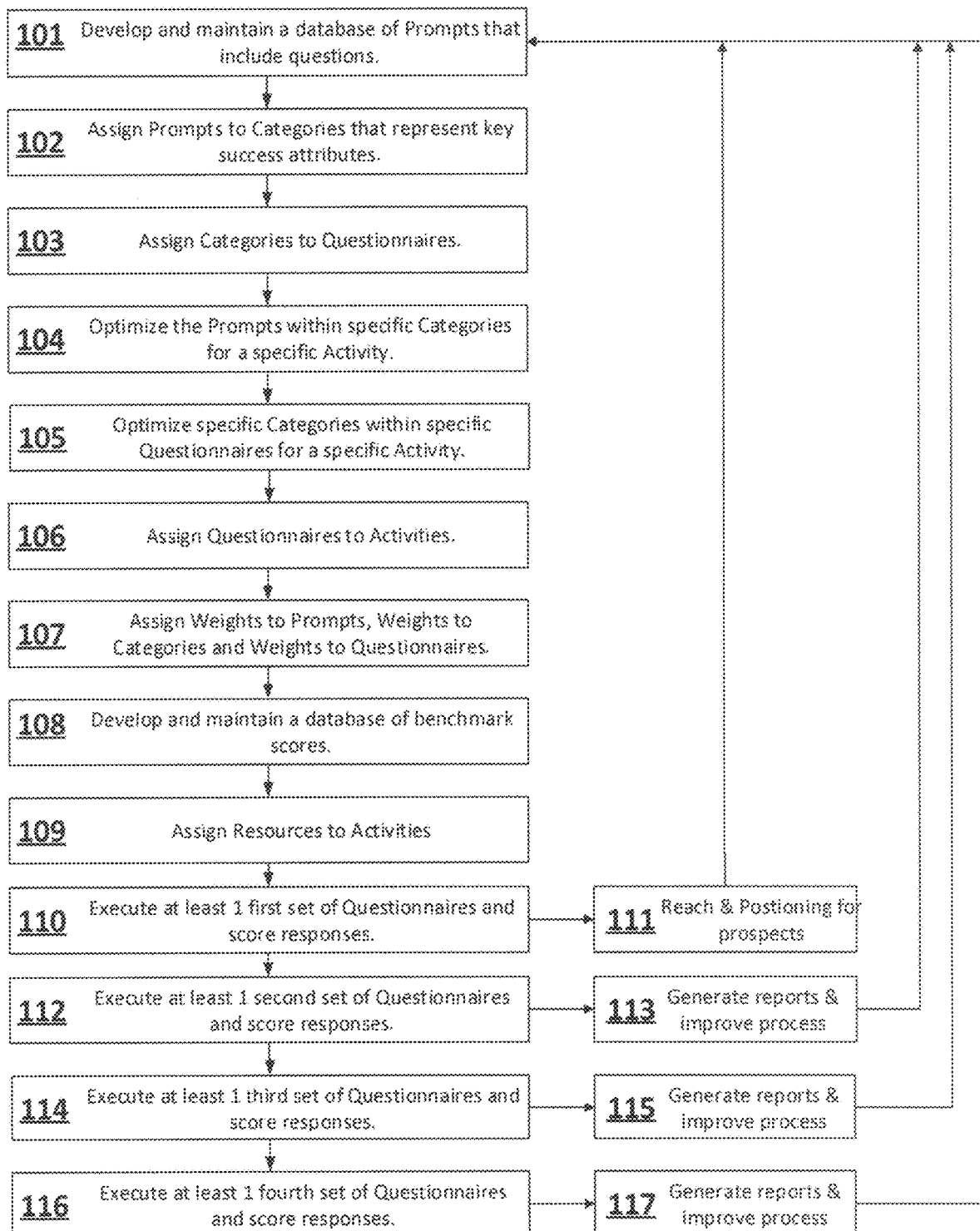
FIG. 1 illustrates a first embodiment of an overview of the present invention.

In an overview of the first embodiment illustrated in FIG. 1, the present invention provides a method and apparatus for organizations to elicit information to determine the probable match between a solution and an opportunity, such as a job candidate and a job position. For example, organizations can use the present invention to attract the best prospects even those not actively searching for a job, facilitate pre-filtering of job candidates, select the best job candidate, measure actual candidate performance and provide feedback to improve the prospecting, filtering, selection and performance improvement process.

The present invention enables one or more workers in an organization to develop and maintain a database of Prompts that include questions 101.

One or more workers then assign Prompts to Categories that represent key success attributes 102, such as assigning one or more technical questions to a technical skills category, such as programming ability.

One or more workers then assign Categories to Questionnaires 103, such as assigning a technical category, a leadership skills category and a communications skills category to a questionnaire tailored to an interview for a software engineering lead.

One or more workers then optimize the Prompts within specific Categories for a specific Activity, such as a job interview 104. For example, one or more workers can adjust the technical questions within the technical category to better elicit information about the technical skills required for a specific job within a specific department during a specific interview.

One or more workers can then optimize the Categories within specific Questionnaires for a specific activity, such as a job interview 105. For example, one or more workers can adjust the skills to assess within a technical questionnaire to better elicit information about the technical skills required for a specific job in a specific department.

One or more workers then assign one or more Questionnaires to an Activity, such as a job interview 106. For example, a technical interviewer may want a job candidate to answer questions from a technical Questionnaire. Similarly, a human resources interviewer may want the same job candidate to answer questions from a behavioral Questionnaire.

One or more workers assign one or more Weights to each Prompt, to each Category and to each Questionnaire 107. This allows one or more workers to adjust the relative importance of Prompts within a Category, adjust the relative importance of Categories within a Questionnaire and adjust the relative importance of Questionnaires within an Interview to improve the overall assessment of fit between a potential solution and an opportunity.

One or more workers develop and maintain a database of benchmark scores 108. For example, an organization may expect a successful candidate for a developer position to score more than 80% in the technical skills Category and more than 60% in the leadership skills Category. The candidate's actual scores can be compared with the benchmark scores and can also be compared with the scores achieved by other candidates for the same job. Similarly, scores that are too high for certain categories may indicate that a candidate may not be sufficiently challenged by the target job which may lead to dissatisfaction or the opportunity to expand the role.

One or more workers then assign one or more Resources to an Activity. For example, a first interviewer may assign a second interviewer to a scheduled interview 109.

One or more solution prospects execute one or more first set of Questionnaires 110. The goal of the first set of Questionnaires is to identify the interests, aspirations and goals of prospects even those who are not actively looking for a job. These prospects may frequent non-job specific forums provided by the present invention or forums that include links from the present invention. Responses to prompts from solution prospects enable client organizations to understand how to reach potentially high performing prospects and also understand how to position opportunities to attract their attention 111.

One or more solution candidates execute one or more second set of Questionnaires. The goal of the second set of Questionnaires is to prescreen unqualified candidates automatically and also to prescreen candidates automatically for specific skills and abilities that are highly predictive of job performance. The responses by each solution candidate are then scored automatically, by one or more workers or by a combination of automatic and manual scoring 112.

The present invention then generates a report that summarizes the scoring from the second set of Questionnaires and enables one or more workers to improve the process 113.

One or more solution candidates execute one or more third set of Questionnaires. The purpose of the third set of Questionnaires is to execute a structured interview that measures skills and abilities that predict job performance. The responses by each solution candidate are scored manually or automatically 114.

The present invention then generates a report that summarizes the scoring from the third set of Questionnaires and enables one or more workers to improve the process 115.

One or more on boarded candidates execute one or more fourth set of Questionnaires. The responses by each solution candidate are then scored manually or automatically 116.

The present invention then generates a report that summarizes the scoring from the fourth set of Questionnaires and enables one or more workers to improve the end-to-end process 117.

System Context

Figure 2:
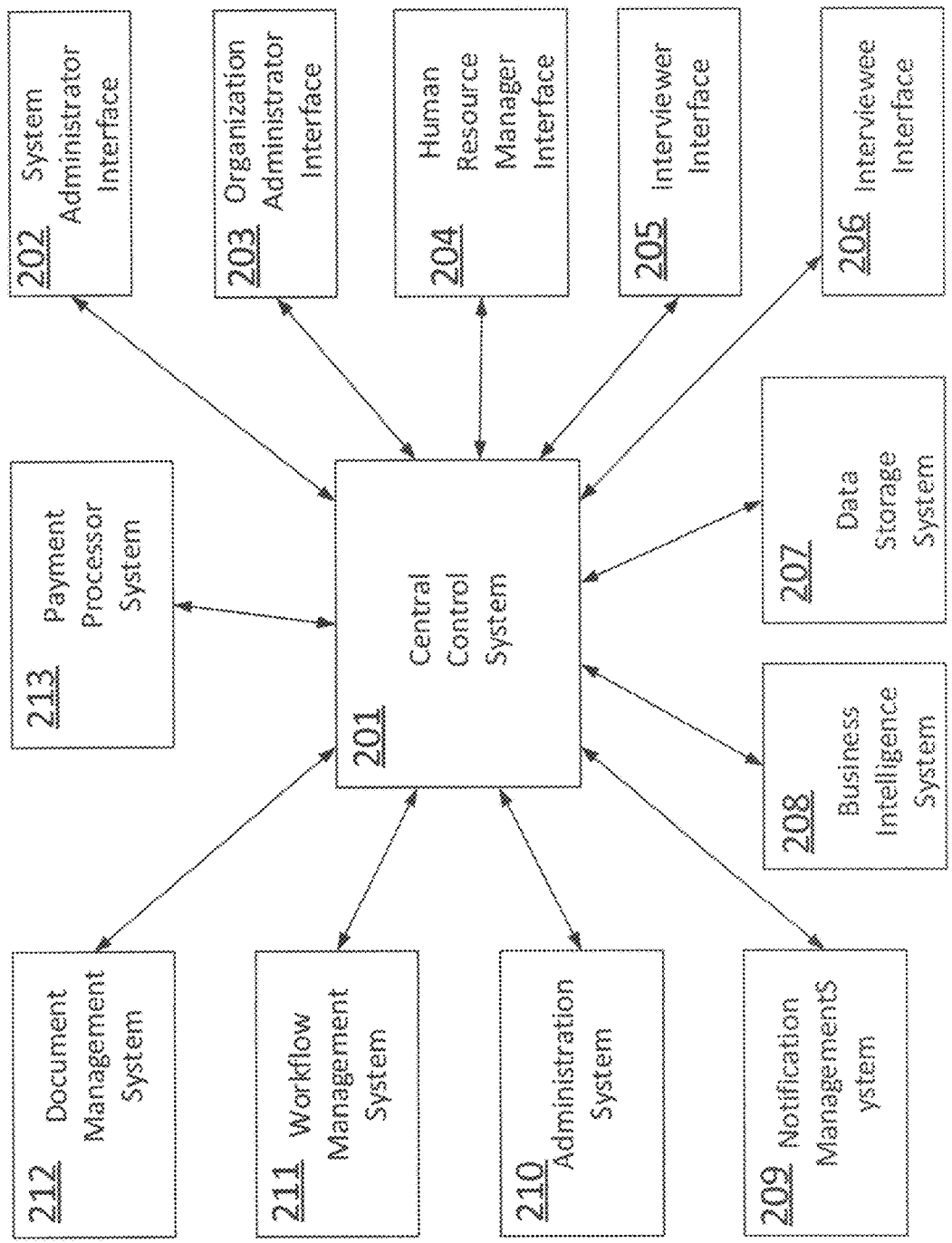
FIG. 2 illustrates a first embodiment of the system architecture of the present invention.

FIG. 2 illustrates the system context of a first embodiment of the apparatus and method of the present invention.

The central control system ("CCS") 201 is operatively coupled to a plurality of other systems and user interfaces. Operative coupling is the preferred method to exchange information between systems. In the present invention, the systems are inter-connected via a combination of wide area networks including the public switched telephone network, local area networks, such as an Ethernet network, token ring networks and wireless networks. Most systems, such as modern computers, include a built in interface to a local network, such as an Ethernet or 802.11b network. The communications protocol used by these networks follow an international standard, such as 802.11b, that enables these systems to exchange data using a pre-determined method. However, local area network connectivity only ensures the integrity of data transfer. It is also necessary to specify the information to transfer, its source location and its intended location in the destination system. Each system has its key information stored in pre-determined locations in its database. When the installation engineers configure the interface between two systems they specify the pre-determined location of the required information in the source system's database and the pre-determined location for that information in the destination system's database. The engineers also specify the pre-determined frequency of information transfer (e.g., continuous, every day at 10:00 PM PT), the pre-determined format to use (e.g., synchronous, flat file Extract Transform Load "ETL") and the pre-determined error checking protocol to use. The combination of network connectivity and the configuration of the communication method by installation engineers enable systems to be operatively coupled to the CCS.

The user interfaces are operatively coupled to the CCS 201. The different types of users access the CCS through a plurality of user interfaces. The user interfaces include the System Administrator interface 202, the Organization Administrator interface 203, human resource manager interface 204, interviewer interface 205 and the interviewee interface 206 (collectively "the user interfaces"). The user interfaces are the input and output gateways for communications with the CCS The data storage system 207 is operatively coupled to the CCS. The data storage system stores the plurality of data used by the present invention.

The business intelligence system 208 is operatively coupled to the CCS. The business intelligence system calculates and stores a plurality of information about trends, patterns and relationships in the databases used by the present invention.

The notification management system 209 is operatively coupled to the CCS. The CCS sends an alert to the notification management system whenever an event occurs that requires the attention of a user or other entity. For example, when an interview has been scheduled, the CCS will instruct the notification management system to alert the relevant user by sending an email or alternative notification.

The administration system 210 is operatively coupled to the CCS. The administration system enables a user to administer the CCS. For example, the system administrator can use the administration system to add, edit and delete organizations that are permitted to use the present invention. The administration function also provides forum services that support community discussions. Specifically, non-job specific forums are used to attract potentially high performing solution prospects who are no, actively looking for a job.

The workflow management system 211 is operatively coupled to the CCS. The workflow management system enables organizational employees to manage interview prompts, such as questions, and also enables interviewee's responses to prompts to be captured and scored.

The document management system 212 is operatively coupled to the CCS. The document management system is used to store and retrieve key documents, such as resumes and interview summaries.

The payment processor system 213 is operatively coupled to the CCS. The payment processor system enables payments to be sent from client organizations to the operator of the present invention.

Figure 3:
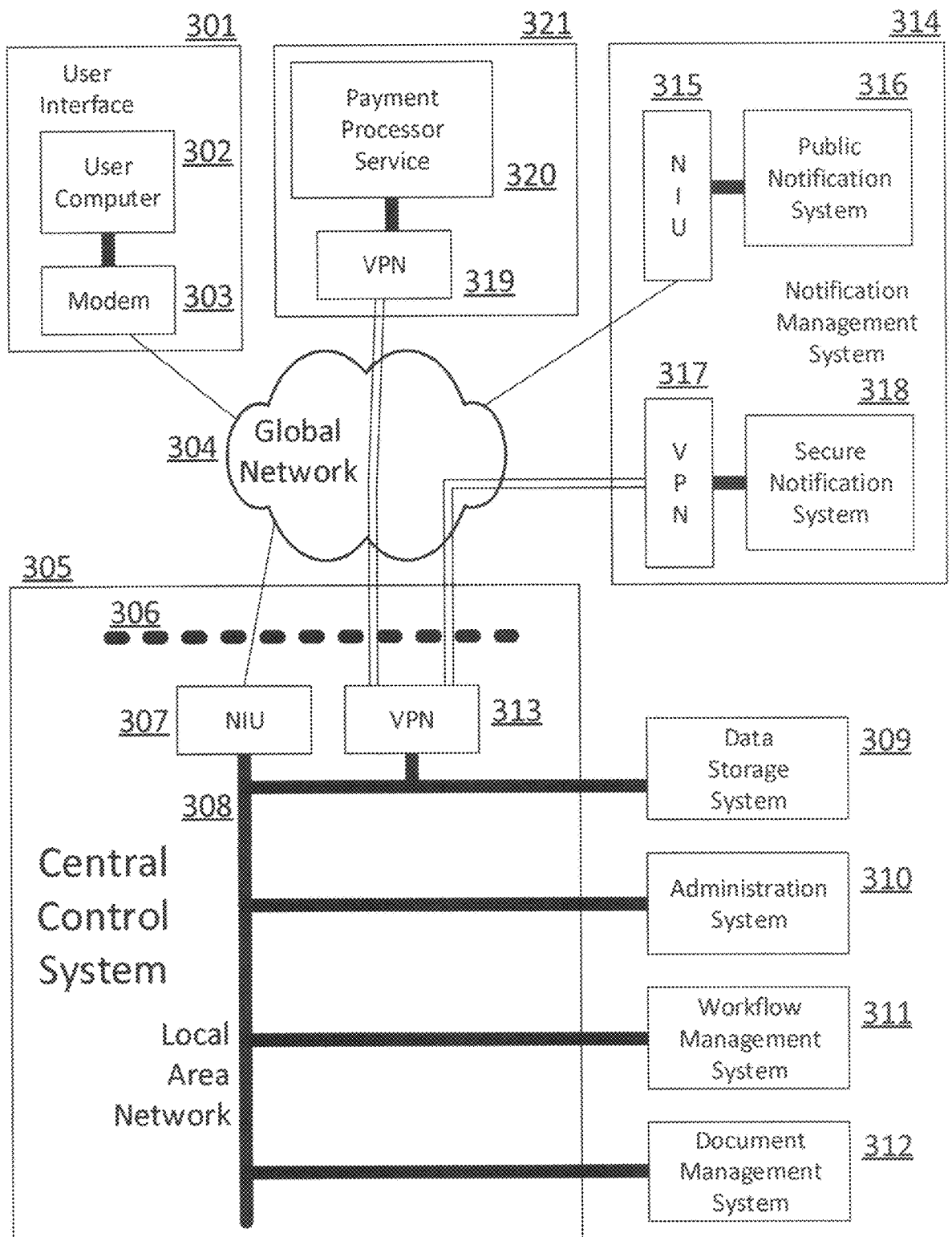
FIG. 3 illustrates a first embodiment of the technical platform for the central control system of the present invention.

FIG. 3 illustrates the network connectivity of a first embodiment of the apparatus and method of the present invention.

The user interfaces 301 include a computer 302 and a modem 303. Many companies make computers that a user can use to access the CCS including Hewlett Packard, Gateway and Toshiba. In addition, many companies make modems that can connect to the CCS including 3Com Corp., D-Link Systems, Inc., and US Robotics. The user's computer is connected to the CCS via the modem and a Global Network 304, such as the Internet. The user's modem can be connected to the Global Network using at least one of a plurality of services including public or private networks such as the public switched telephone network, dedicated data line, cable service, cellular service, WiFi service, personal communication system ("PCS"), satellite network, and a microwave connection. These types of connections are provided by a plurality of organizations including local and regional telephone operating companies, cable TV companies and other providers of private and public networks.

The CCS 305 includes a local area network 308 that is connected to the global network 304 via a network interface unit ("NIU") 307 and a firewall 306. The CCS is also connected to other systems via the local area network 308 including the Data Storage System 309, Administration System 310, Workflow Management System 311, and the Document Management System 312.

The CCS 305 also includes a Virtual Private Network ("VPN") modem 313 that is connected to the Secure Notification System 318 and the Payment Processor System 320. Many companies make VPN modems that can be used with the present invention including Netgear, Linksys and Cisco. The Secure Notification System 318 is connected to the CCS via the Global Network using a Virtual Private Network modem 317. In addition to the Secure Notification System 318, the Notification Management System 314 includes a Public Notification System 316. The Public Notification System 316 is connected to the Global Network using a Network Interface Unit 315. The preferred embodiment of the present invention can use a plurality of Public Notification Systems including email services and mobile services. The present invention can operate with many such email services including Yahoo, Hotmail and Gmail. Many organizations provide such email services inducting Yahoo, Microsoft and Google. The Payment Processor System 321 includes a Payment Processor Service 320 that is connected to the Global Network via a VPN modem 319. Many organizations provide such Payment Processor Services that can be used with the present invention including Paypal, Western Union, WePay and Verisign.

Figure 4:
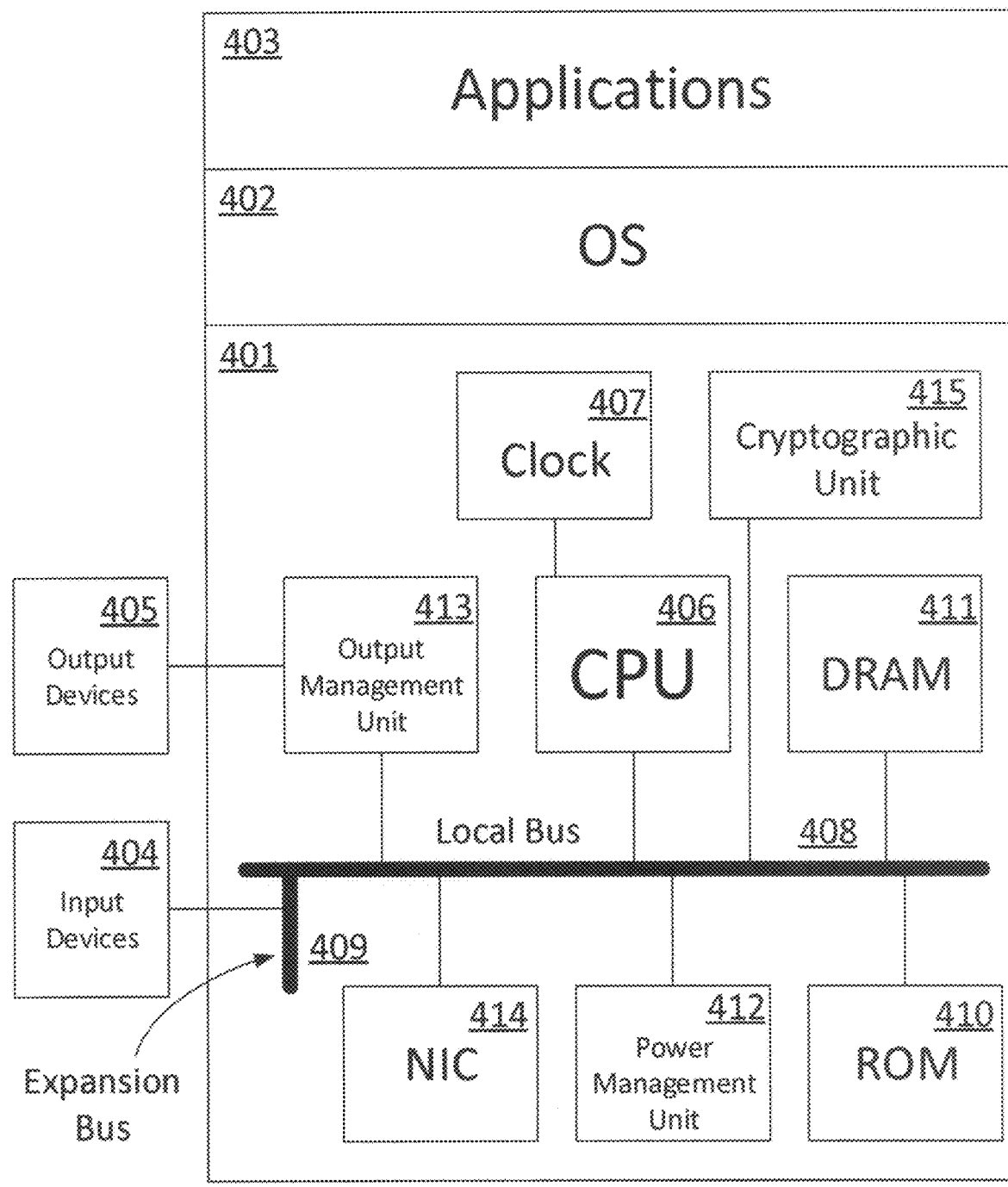
FIG. 4 illustrates a first embodiment of the user interface to the present invention.

FIG. 4 illustrates the key components of the CCS in a first embodiment of the apparatus and method of the present invention.

The Central Control System ("CCS") includes a number of key components including the main hardware 401, the operating system 402, software applications 403, input devices 404 and output devices 405. The operating system 402 is the interface between the applications and the hardware. It controls the execution of computer applications and provides services to these applications. The preferred embodiment of the present invention can use one of a plurality of standard commercial operating systems, such as Microsoft windows, Linux and UNIX. The applications 403 include software tools such as commercial anti virus software available from companies such as McAfee and Norton, and a browser, such as Microsoft Internet Explorer, Chrome and Firefox. The CCS also includes some unique code that implements some of its unique functions described in this disclosure, such as coordinating data interchange among the different systems illustrated in FIG. 2. This unique code can be programmed using one or more standard programming languages including java, javascript, PHP, HTML, C, C+, and visual basic. Input devices 404 include a plurality of commercial options such as a keyboard, a camera, a mouse, and a microphone. Output devices 405 include a plurality of commercial options such as a monitor and speakers. These standard commercial input devices 404 and output devices 405 are available from a plurality of vendors such as CompUSA and Office Depot.

The main hardware 401 in the CCS can be a conventional personal computer or a conventional server with sufficient memory and processing power. To one skilled in the art, it will be evident that the functionality of the CCS can be distributed over multiple inter-connected personal computers or multiple inter-connected severs. The main hardware includes a number of key components including the central processing unit ("CPU") 406, clock 407, local bus 408, expansion bus 409, read only memory ("ROM") 410, dynamic random access memory ("DRAM") 411, power management unit 412, output management unit 413, network interface card 414 and cryptographic unit 415.

The central processing unit ("CPU") 406 is the component of the CCS that performs most of the data processing. It interprets instructions, performs logical and arithmetic operations on data, and controls input and output functions. The preferred embodiment of the present invention can use a commercial CPU from a plurality of vendors, such as a Pentium 4 supplied by Intel and X4 9850 supplied by AMD. The clock 407 regulates the rate at which the CPU processes instructions. The CCS also uses the clock to synchronize the operation of its key components. A CPU such as a Pentium 4 can operate at a clock speed of 3.4 GHz. The CCS uses the local bus 408 to inter-connect its key components. These key components exchange data via the local bus. The CCS uses the expansion bus 409 to enable expansion cards to exchange data with the CPU and memory. Examples of commercial expansion cards are sound cards and graphics cards. The expansion bus also enables input devices 404, such as a mouse, to input data that can be used by the key components of the CCS. The read only memory ("ROM") 410 includes the instructions that the CPU executes to perform its basic operations. The vendor of the computer platform that comprises the hardware component of the CCS provides the instructions that are stored in the ROM. When the CCS's power is removed then restored, the instructions in the ROM remain unchanged. The dynamic random access memory ("DRAM") 411 includes instructions that the CPU executes to perform selected tasks. The DRAM also stores the data that is used by the instructions executed by the CPU. When the CCS's power is removed then restored, the information in the DRAM is lost. The CCS uses the power management unit 412 to supply and regulate the power required to operate the key components of the CCS. The CCS uses the output management unit 413 to interface with output devices, such as a monitor. The CCS uses the network interface card ("NIC") 414 to interface with external networks, including an Ethernet network, public switched telephone network and a wireless network. The CCS uses the cryptographic unit 415 to support secure communications with external systems, such as the payment processor system and secure notification management system. It is described in more detail below in the section that describes the payment processor system. The vendor of the computer platform, which is used by the CCS, provides the local bus, expansion bus, ROM, DRAM, power management unit, output management unit, network interface card and cryptographic unit. Specific components, including the NIC, can be obtained from alternate commercial vendors including CompUSA and Office Depot.

Figure 5:
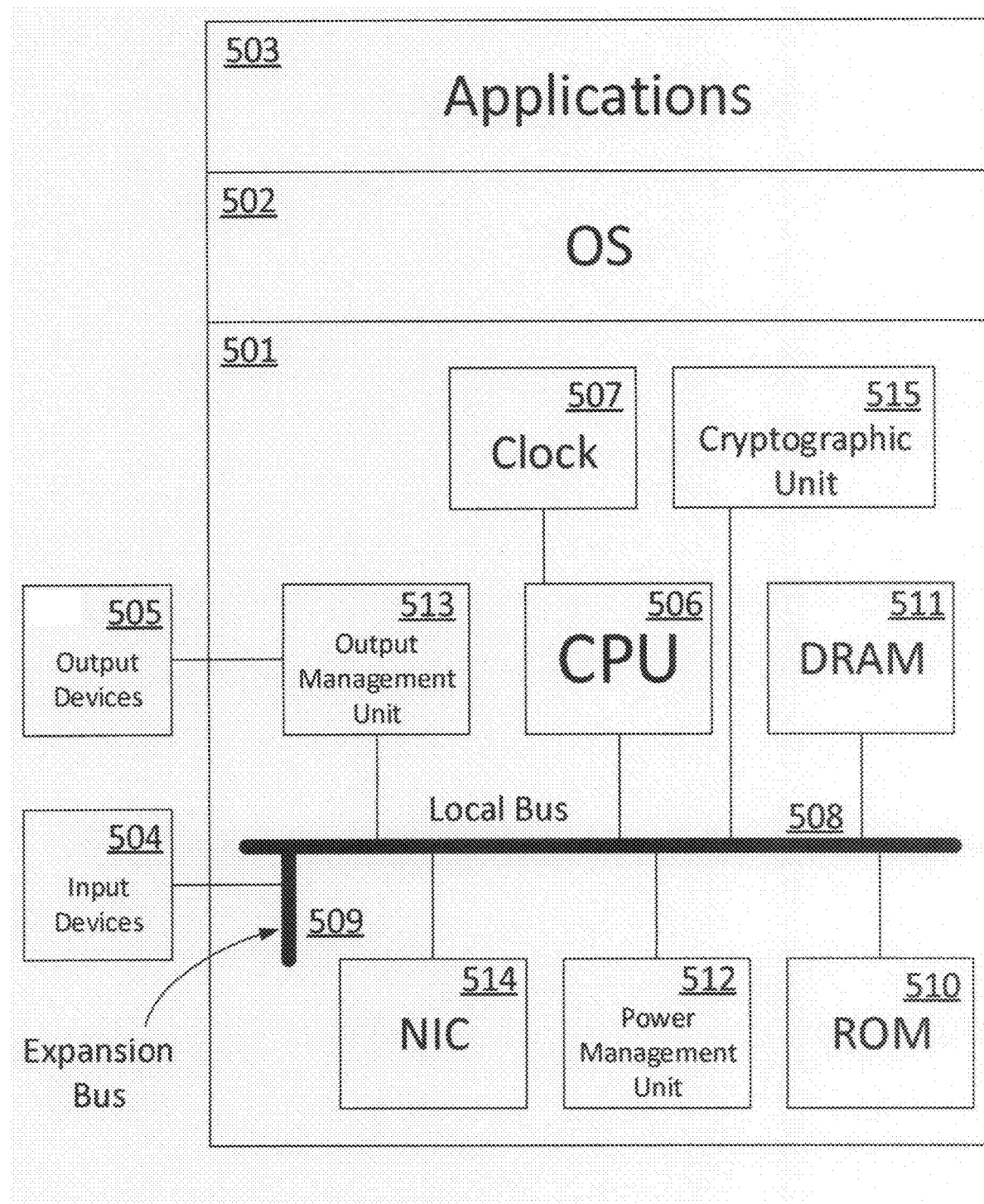
FIG. 5 illustrates a first embodiment of the user interface to the present invention.

FIG. 5 illustrates the key components of the user interface in a first embodiment of the apparatus and method of the present invention.

In a preferred embodiment of the present invention the user interface device 301 is a conventional personal computer that includes, the main hardware 501, the operating system 502, software applications 503, input devices 504 and output devices 505. The main hardware 501 in the user interface device includes a number of key components including the central processing unit ("CPU") 506, clock 507, local bus 508, expansion bus 509, read only memory ("ROM") 510, dynamic random access memory ("DRAM") 511, power management unit 512, output management unit 513, network interface card 514 and cryptographic unit 515. These components are substantially the same as the similarly named components in the CCS as illustrated in FIG. 4. They also perform substantially the same functionality and are available from the same vendors. The key differences are that the components in the CCS have higher performance requirements than the equivalent components in the user interface device. In addition, the user interface device includes, commercial software applications such as a word processor application and graphic design application. An example of a word processor application that can be used by the present invention is Microsoft Word. An example of a graphic design application that can be used by the present invention is Microsoft Visio. Examples of higher performance components for the CCS are a faster clock speed, a more powerful CPU and higher capacity DRAM.

FIG. 6 illustrates the key components of the Data Storage System in a first embodiment of the apparatus and method of the present invention.

The data storage system 207 is a conventional hard disk drive that includes non-volatile, magnetic-based hard disk storage that stores digitally encoded data. The data is retained in the data storage system after power is removed then restored. A plurality of suppliers manufacture data storage systems that can be used by the present invention including EMC, Western Digital, Seagate, Maxtor, Iomega, and Hitachi. The data storage system is comprised of a plurality of databases that are described below. The present invention can use one of a plurality of database systems to house the databases including Oracle and SQL database systems.

The CCS uses the CCS database 601 to store information about how users are using of the CCS. The CCS database contains a plurality of fields including a unique reference key for each record in the CCS database, the unique reference key of each worker who has logged into the CCS and tracking information about the functions of the CCS used by each worker during each login session.

The CCS uses the Organization database 602 to store information about organizations that are using of the CCS. The Organization database contains a plurality of fields including a unique reference key for each record in the organization database, the organization's name, location, contact phone numbers, email address, key contact, the key contact's login credentials for the CCS and the unique reference key for the key contact's manager.

The CCS uses the Resource database 603 to store information about Resources, such as organizational workers and interviewees. For each resource, the resource database contains a plurality of fields including a unique reference key for each record in the resource database, the resource's identifier or name, location, contact phone numbers, email address, resume, role, login credentials for the CCS and the unique reference key for the resource's manager.

The CCS uses the prompt database 604 to store information about prompts, such as questions. For each prompt, the prompt database contains a plurality of fields that include a unique reference key for each record in the prompt database, help information about the prompt, the text of the prompt, an action statement that the guides the user, an input field to capture the user's response to the prompt, a default value for the response, an indication of whether the prompt is multiple choice, the identifier for the next prompt in the sequence, the Category for the prompt, the projected time to respond, the applicable roles for the prompt, the weight for the prompt, the start date and time for the prompt's availability, and the end date and time for the prompt's availability.

The CCS uses the category database 605 to store information about Categories, such as job skills. The category database contains a plurality of fields including a unique reference key for each record in the category database, the name of the category, and notes about the category.

The CCS uses the questionnaire database 606 to store information about Questionnaires that are comprised of categories and prompts. The questionnaire database contains a plurality of fields including a unique reference key for each record in the questionnaire database, the name of the questionnaire, the categories, the target duration of each category, the weight of each category, whether each category has sequential or randomized prompts and notes about each questionnaire.

The CCS uses the activity database 607 to store information about activities, such as interviews. The activity database contains a plurality of fields including a unique reference key for each record in the activity database, the name of the activity, the job role, the department, the date and time, duration of the activity, interviewers, interviewees, questionnaires, questionnaire duration, questionnaire weight, and benchmark score.

The CCS uses the notification database 608 to save and archive information about notifications. The notification database also stores links to templates for the different types of notification messages. A notification is a message sent to a user to inform that user that an event has occurred, such as an interview has been scheduled. For each notification, the notification database contains a plurality of fields including a unique reference key for each record, the type of event that has caused the notification (e.g., an interview), the unique reference key for the event that has caused the notification (e.g., the unique reference key for a specific interview), the type of template to use for the notification, the unique reference key for the user to be notified (e.g., unique reference key for the interviewer), the date and time of the event that caused the notification, the date and time that the notification was sent, the title of the notification, the message within the notification, the unique reference key for each user who shall receive a carbon copy of the notification and the unique reference key for each user who shall receive a blind copy of the notification.

The CCS uses the administration database 609 to save and archive information about client organizations that are using the present invention and specific configuration information. For each organization the administration database contains a plurality of fields including a unique reference key for each record, a name for the organization, contact information for the organization, and licensing and payment information for the organization. For each specific configuration parameter, such as the list of Categories, the administration database contains a plurality of fields including a unique reference key for each record and the permitted values. For each forum, the administration database contains a plurality of fields including a unique reference key for each record, the unique reference key for each contributor, the content of each contribution, the date and time stamp for each contribution, and the unique reference key for each thread.

The CCS uses the workflow management database 610 to save and archive information about the workflow that is the preferred method to execute a questionnaire. The workflow management system has its own database that is described below. However, a link to each questionnaire, that is created in the workflow management system and submitted to the CCS for use, is stored in the workflow management database. For each workflow submitted to the CCS, the workflow management database contains a plurality of fields including a unique reference key for each record, a name for the workflow, a description of the workflow and the unique reference key for the type of questionnaire that uses the workflow.

The CCS uses the document management database 611 to save and archive information about the preferred document management life cycle for documents, including resumes and interview summary documents. The document management system has its own database that is described below. However, each document management life cycle, that is configured in the document management system and submitted to the CCS for use, is stored in the document management database. For each document management life cycle submitted to the CCS, the document management database contains a plurality of fields including a unique reference key for each record, a name for the document management life cycle, a description of the document management life cycle and the unique reference key for the type of resume or interview summary that uses the document management life cycle.

The CCS uses the payment processor database 612 to save and archive information about payments submitted by client organizations to use the present invention. The payment processor system has its own database that is described below. However, each payment that is submitted to the CCS is stored in the payment processor database. For each payment submitted to the CCS, the payment processor database contains a plurality of fields including a unique reference key for each record, the buyer's payment credentials, the amount of the payment, the payment method, the type of license, the date and time that the payment was submitted, whether the payment was accepted or rejected and the date and time that the payment was confirmed or rejected.

The CCS uses the audit database 613 to save and archive transactional information about Activities such as interviews. The audit database contains a plurality of fields including a unique reference key for each record, information about each activity performed by the CCS, the time that the activity occurred, and the unique reference key of the person who initiated the activity. The information in the audit database enables each transaction to be reconstructed and analyzed for audit purposes.

The CCS uses user database 614 to save and archive information about users. For each user, the user database contains a plurality of fields including a unique reference key for each record, name, address, contact phone numbers, email address, web page, social network identification names, resume, user name for the CCS, and login credentials for the CCS.

Figure 7:
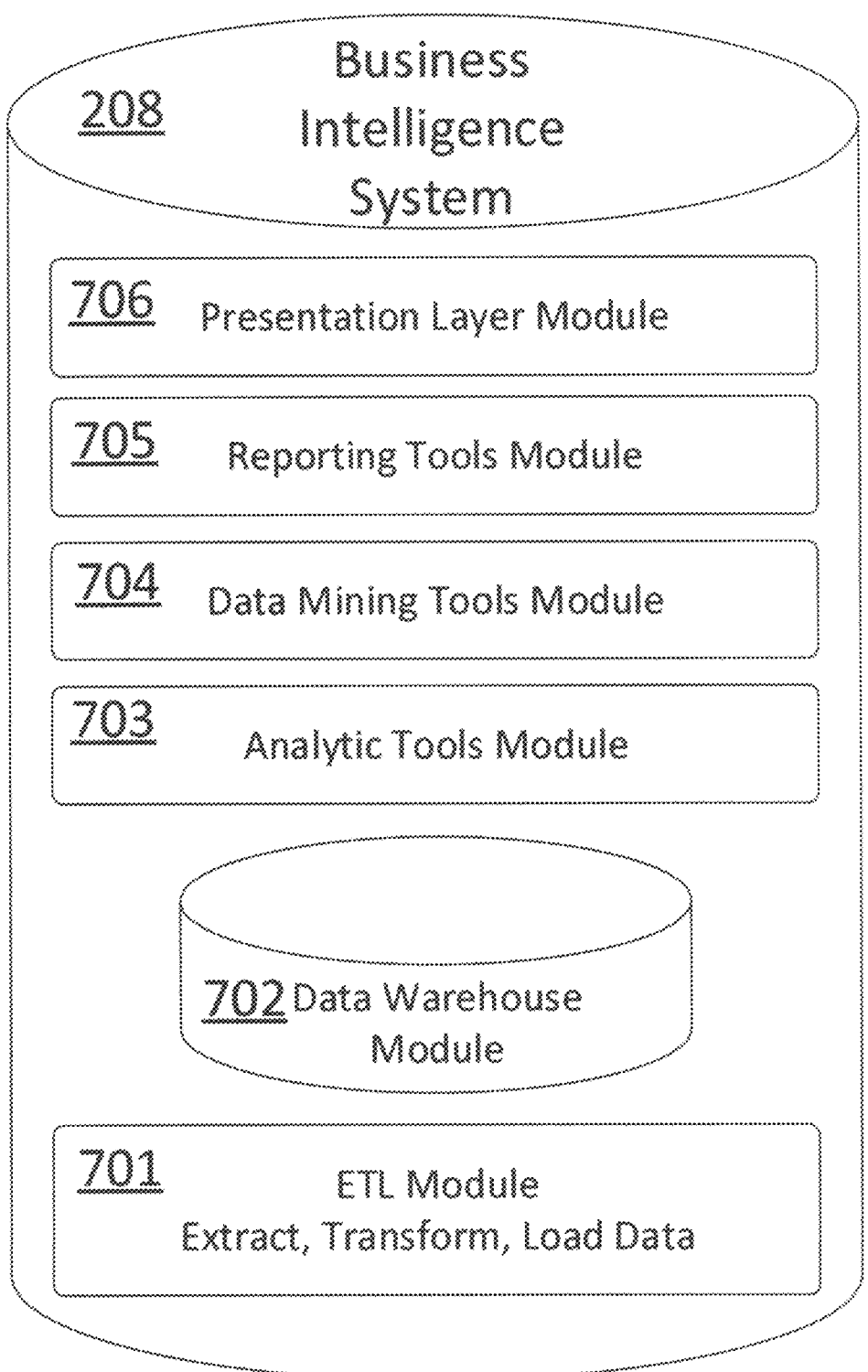
FIG. 7 illustrates a first embodiment of the business intelligence system ("BIS") of the present invention.

FIG. 7 illustrates the key components of the Business Intelligence System in a first embodiment of the apparatus and method of the present invention.

The Business Intelligence System 208 is operatively coupled to the CCS. Many companies supply business intelligence systems that can be used by the present invention including Microstrategy and Oracle. The CCS uses the business intelligence system to analyze data stored in the plurality of databases that comprise the data storage system. The purpose of the analysis by the business intelligence system is to identify trends, patterns and relationships that may be hidden in the data stored in the data storage system.

The present invention uses a commercial Business Intelligence System 208 that is illustrated in FIG. 7. It includes a plurality of modules including an extract, transform and data load "ETL" module 701, a data warehouse module 702, an analytic tools module 703, a data mining module 704, a reporting tools module 703 and a presentation layer module 706. The main purpose of a business intelligence system is to enable organizations to capture, process and analyze vast amounts of data from a plurality of sources then identify trends, patterns and relationships that can facilitate business decision-making.

The ETL module 701 is the interface between the Business Intelligence System and the CCS. The main purpose of the ETL module is to transfer data from the CCS to the data warehouse. Using ETL tools to operatively couple a system, such as the Business Intelligence System, to the CCS is explained above in the description of FIG. 2.

The data warehouse module 702 is a database built in a commercial storage system substantially the same as the data storage system described in FIG. 6. The data warehouse module contains a copy of a pre-determined subset of the total data that is available in the data storage system. The system administrator user specifies the data in the data storage system that the system administrator wants to use for business analysis. The installation engineer configures the ETL module to extract that pre-determined data from the source database in the data storage system, then configures the ETL module to transform that data into a format that is compatible with the data warehouse, then configures the ETL module to load the transformed data into the pre-determined database locations in the data warehouse module. The installation engineer also configures the ETL module to repeat this extract, transform and data load procedure periodically. Many vendors offer commercial data warehousing solutions including Hyperion, Microstrategy and Oracle.

The analytic tools module 703 includes standard on-line analytical processing (OLAP) functionality. OLAP software enables users to create various views and representations of data in the data warehouse. OLAP functionality enables the system administrator user to access, analyze and model business issues and share the information that is in the data warehouse. Many vendors offer commercial data warehousing and OLAP solutions including Hyperion, Microstrategy and Oracle. The OLAP council creates OLAP standards.

The data mining tools module 704 enables the system administrator user to discover trends, patterns and relationships in the data stored in the data warehouse module. Data mining software is designed to analyze large volumes of data using sophisticated data search techniques then apply statistical methods to discover trends, patterns and relationships in the data. Many vendors offer commercial data mining software including Baan Software, Oracle, SAP, Sybase and Tableau Software. The Data Mining Group is an independent, vendor led consortium that develops data mining standards.

The reporting tools module 705 enables the system administrator user to create reports that display the data stored in the date warehouse as well as information that illustrates the trends, patterns and relationships in the data stored in the data warehouse module. Many vendors offer commercial reporting software including Business Objects, Cognos, Crystal Reports and Microstrategy.

The presentation layer module 706 includes graphics and multimedia interfaces that enable information and reports to be displayed in a user-friendly manner. The reporting tools described above all include a presentation layer module.

Figure 8:
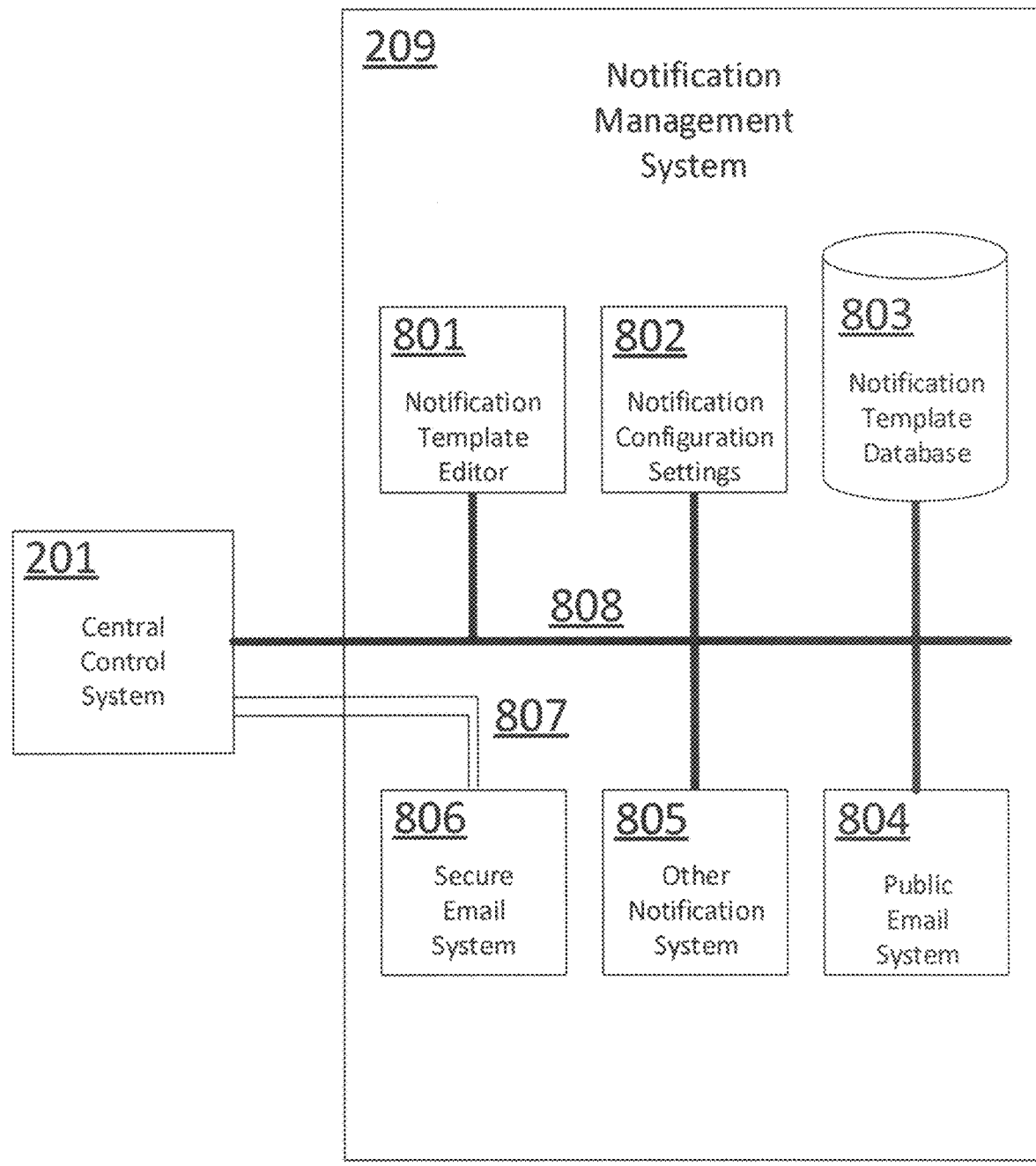
FIG. 8 illustrates a first embodiment of the notification management system ("NMS") of the present invention.

FIG. 8 illustrates the key components of the notification management system in a first embodiment of the apparatus and method of the present invention.

The notification management system 209 is operatively coupled to the CCS. The purpose of the notification management system is to send a notification whenever an event occurs that requires the attention of a user. The CCS sends a notification message via the notification management system to inform the recipient of the notification that a key event has occurred such as an interview has been scheduled. The system administrator user configures the notification management system to monitor a plurality of other events then alert the pre-determined user when the specific event occurs.

FIG. 8 illustrates the Notification Management System used by the present invention. This Notification Management System includes a plurality of modules including a notification template editor 801, a notification configuration settings module 802, a notification template database 803, at least one public email system 804, at least one other notification system 805, a secure email system 806, a virtual private network (VPN) 807 and a wide area network 808.

The notification template editor 801 is a standard commercial word processor that the system administrator user can use to draft notification templates. The system administrator user then saves those templates into the notification template database 803. The system administrator inserts bookmarks into the notification template where information must be added to convert the template into an actual notification message. For example, the system administrator inserts a bookmark for the notification address (such as an email address) of the pre-determined user to whom the notification shall be sent.

The system administrator user uses the notification configuration settings module 802 to configure and enable the notifications. For example, in one embodiment of the present invention the system administrator user will configure a notification to be sent whenever an interview is scheduled. The configuration information will include a plurality of information including the event (e.g., an interview), the contact information for the user to be notified, the title of the notification, information about the job, and information about the interviewee.

The notification template database 803 is used to store notification templates. For each notification template, the notification template database contains a plurality of fields including a unique reference key for each record, the unique reference key for the type of event for which the notification template shall be used, the title of the interview, the standard message in the notification, the unique reference key for each user who shall receive the notification, the unique reference key for each user who shall receive a carbon copy of the notification and the unique reference key for each user who shall receive a blind copy of the notification. When a predetermined event occurs, the CCS will identify the predetermined users to whom the notification shall be addressed, the predetermined users who shall receive a copy of the notification and the predetermined users who shall receive a blind copy of the notification. The CCS passes this information and a plurality of other information, such as the predetermined template to use for the specific event, to the notification management system that extracts information from the notification database 608 to fill in the blanks in the predetermined notification template.

The public email system 804 enables users to receive notifications from the CCS by email. It also enables users to send emails to the CCS. A plurality of public email systems are available to users including yahoo mail, hotmail, and gmail. When a user registers with the CCS, that user must input an email address that the CCS will use to send notifications.

To one skilled in the art, it will be evident that the CCS can use other notification systems 805 to notify users that an event has occurred. Other possible notification systems include instant messaging, text messages, telephone service, and wireless services. When the user registers with the CCS, the user can input their contact information for their alternative notification systems.

The secure email system 806 enables users to receive secure notifications from the CCS by email. It also enables users to send secure emails to the CCS. A plurality of vendors provide secure email services, such as Zix mail. When a user registers with the CCS, the CCS will give that user a secure email address. The CCS is connected to the secure email system by a virtual private network (VPN) 807. Commercial telephone companies such as Verizon provide virtual private networks. These VPN circuits provide more security than a regular telephone circuit. The other components of the notification management system are interconnected by a combination of wide and local area networks 808. Such networks are described above in the discussion of FIG. 3.

When an event occurs that requires a notification that does not include sensitive information, the CCS will send the notification to the user's secure email address and also to the user's public email address. When an event occurs that requires a notification that does include sensitive information then the CCS will send the notification to the user's secure email address. The CCS will also send a different notification to the user's public email address informing that user that a secure notification message has been sent to that user's secure email address. The user will then log in to the CCS to access the secure notification.

Figure 9:
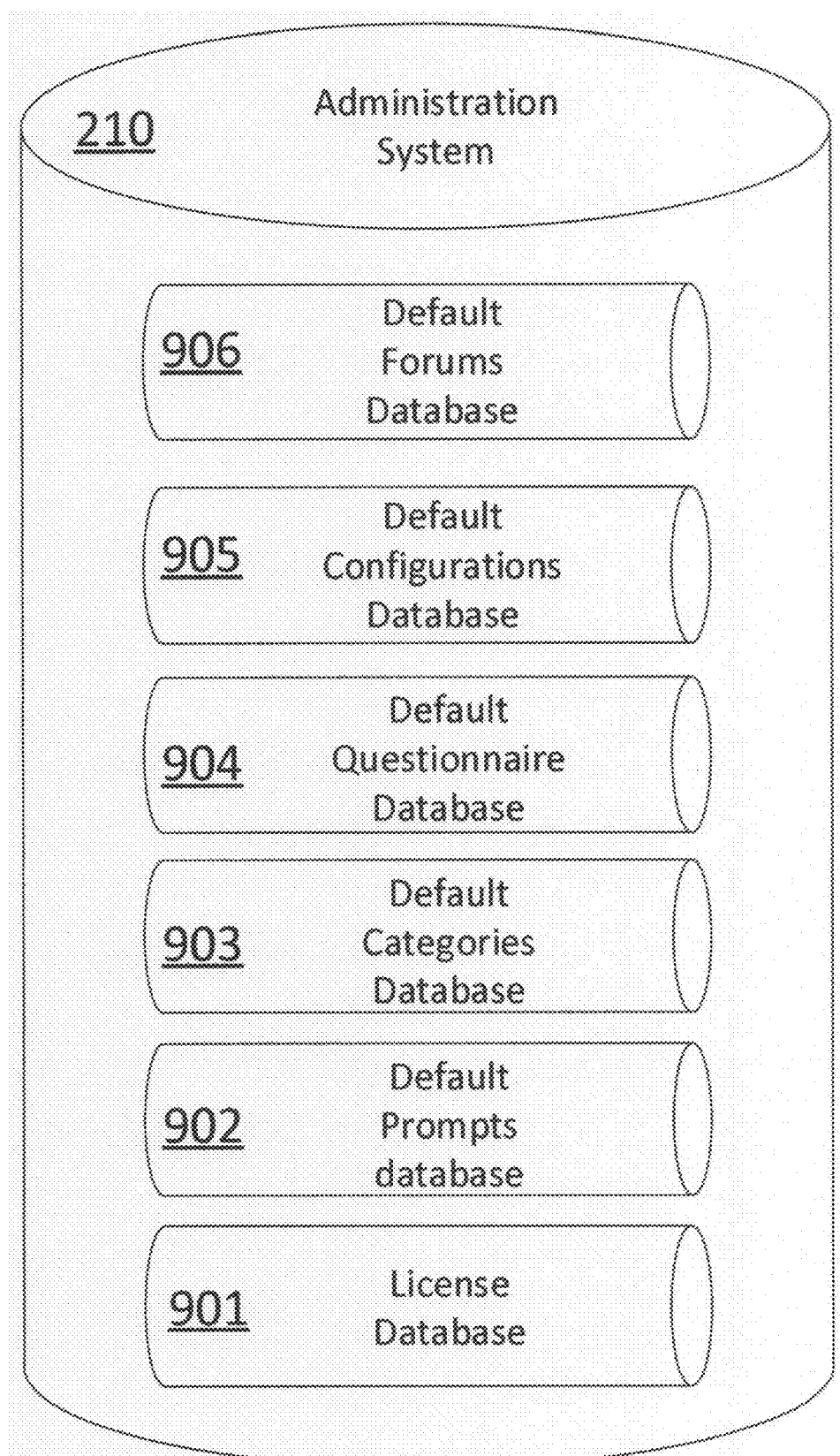
FIG. 9 illustrates a first embodiment of the administration system of the present invention.

FIG. 9 illustrates the key components of the Administration System 210 which is operatively coupled to the Central Control System. The Administration System used by the present invention is comprised of a plurality of modules including a license database 901, a default questions database 902, a default category database 903, a default questionnaire database 904 and a default configuration database 905.

The license database 901 stores information about which organizations are authorized to use the present invention. The license database contains a plurality of fields including a unique reference key for each record in the license database, the unique reference key of each organization, contact information for the organization, and licensing and payment information for the organization.

The default prompts database 902 stores information about the default set of Prompts, such as questions, included in the present invention. The default prompts database contains a plurality of fields including a unique reference key for each record in the default prompts database, the prompt, and meta data for each default prompt.

The default category database 903 stores information about the default set of Categories included in the present invention. The default category database contains a plurality of fields including a unique reference key for each record in the default category database, the name of the category, and meta data for each category.

The default questionnaire database 904 stores information about the default set of Questionnaires included in the present invention. The default questionnaire database contains a plurality of fields including a unique reference key for each record in the default questionnaire database, the name of the questionnaire, and meta data for each questionnaire.

The default configuration database 905 stores information about the default set of configurations included in the present invention. The default configuration database contains a plurality of fields including a unique reference key for each record in the default configuration database, the name of each configuration, and a value or range of values for each configuration.

The default forums database 906 stores information about the default forums included in the present invention. For each forum, the default forums database contains a plurality of fields including a unique reference key for each record, the unique reference key for each contributor, the content of each contribution, the date and time stamp for each contribution, and the unique reference key for each thread.

Figure 10:
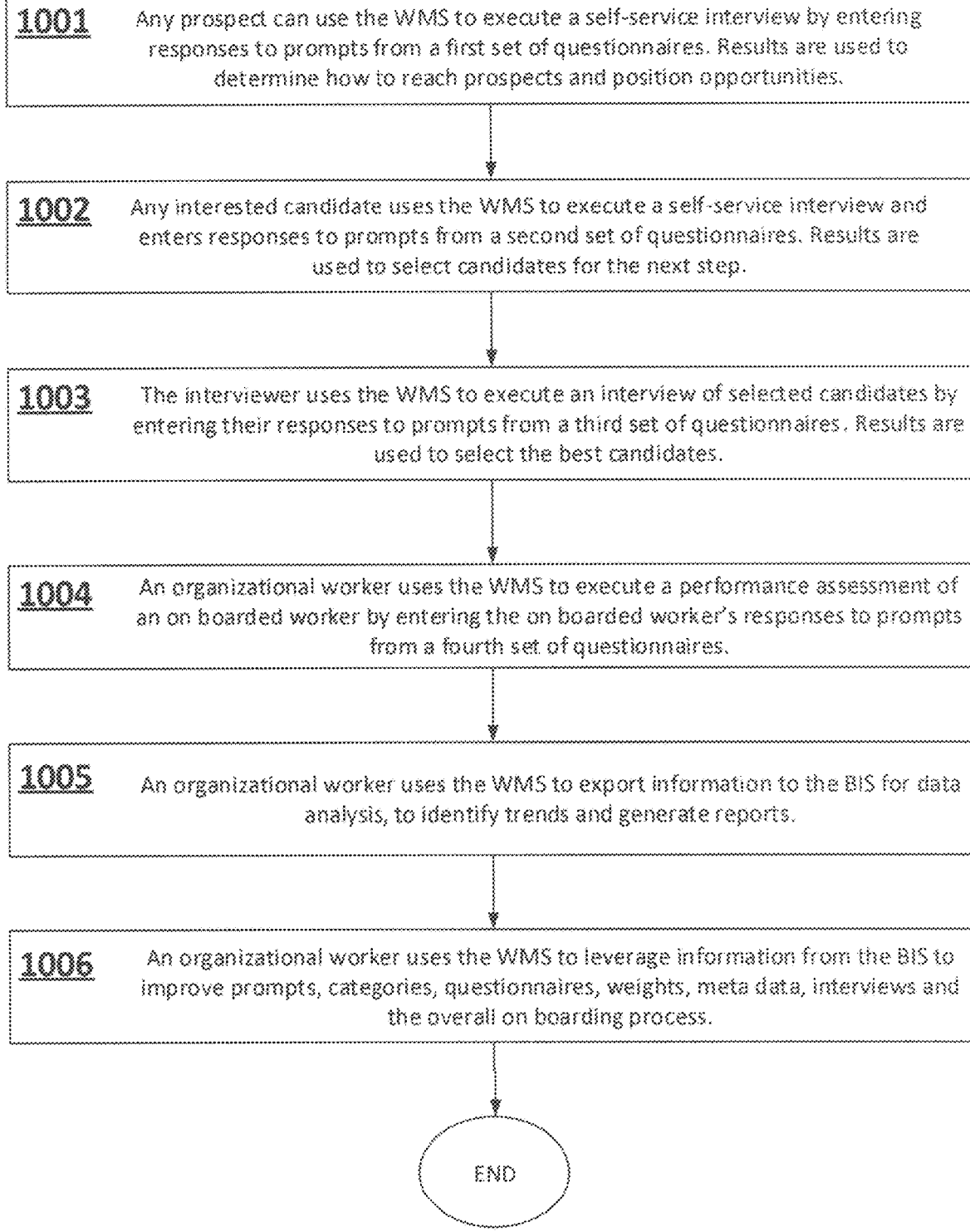
FIG. 10 illustrates a first embodiment of the overview of the workflow management system ("WMS") of the present invention.

FIG. 10 illustrates an overview of the Workflow Management System in a first embodiment of the apparatus and method of the present invention. The Workflow Management System ("WMS") 211 is operatively coupled to the CCS.

The WMS enables a prospect, who may not he actively looking for a new job, to execute a self-service interview and input responses to prompts from a first set of Questionnaires 1001. The responses are used to determine how to reach prospects and position job opportunities. Example prompts include "Which of the following do you use to keep up to date on trends in your industry?", "Which of the following motivates you the most?", "Which of the following company benefits would you value the most?"

The WMS enables a candidate solution, such as an interviewee, to execute a self-service interview and input responses to prompts from a second set of Questionnaires 1002. The responses are used to select the candidates who should proceed to the next step in the hiring process. Example prompts include "Are you a project management professional?", "Do you have more than 5 years of experience as a project manager in the past 10 years?", "Have you managed an I.T. project for a Fortune 500 company?", "Are you a certified scrum master?".

The WMS enables an interviewer to interview selected candidates by entering their responses to prompts from a third set of questionnaires 1003. The responses are used to select the best candidates. Example prompts include "Give me an example of a creative solution that you provided to an unexpected problem in a past job", "What would you do if a key resource was removed from your team one week before a key event?", "What do you believe are the key attributes to succeed in this role?", "What challenges would you expect to face in the first 90 days of the job and how would you overcome them?"

The WMS enables an organizational worker to execute a performance assessment of an on boarded worker by entering the on boarded worker's responses to prompts from a fourth set of questionnaires 1004. Example prompts include "Which skills are more important to this role than you expected?", "What should you have asked during the interview process to get a better understanding of this position?", "What is the most important skill or attribute to succeed in this role?", "What new information or skills can you learn to improve your job performance?".

The WMS enables an organizational worker to export information to the BIS for data analysis, to identify trends, patterns and relationships and also generate reports 1005.

The WMS enables an organizational worker to use information from the BIS to improve prompts, categories, questionnaires, weights, meta data, interviews and the overall onboarding process 1006

Figure 11:
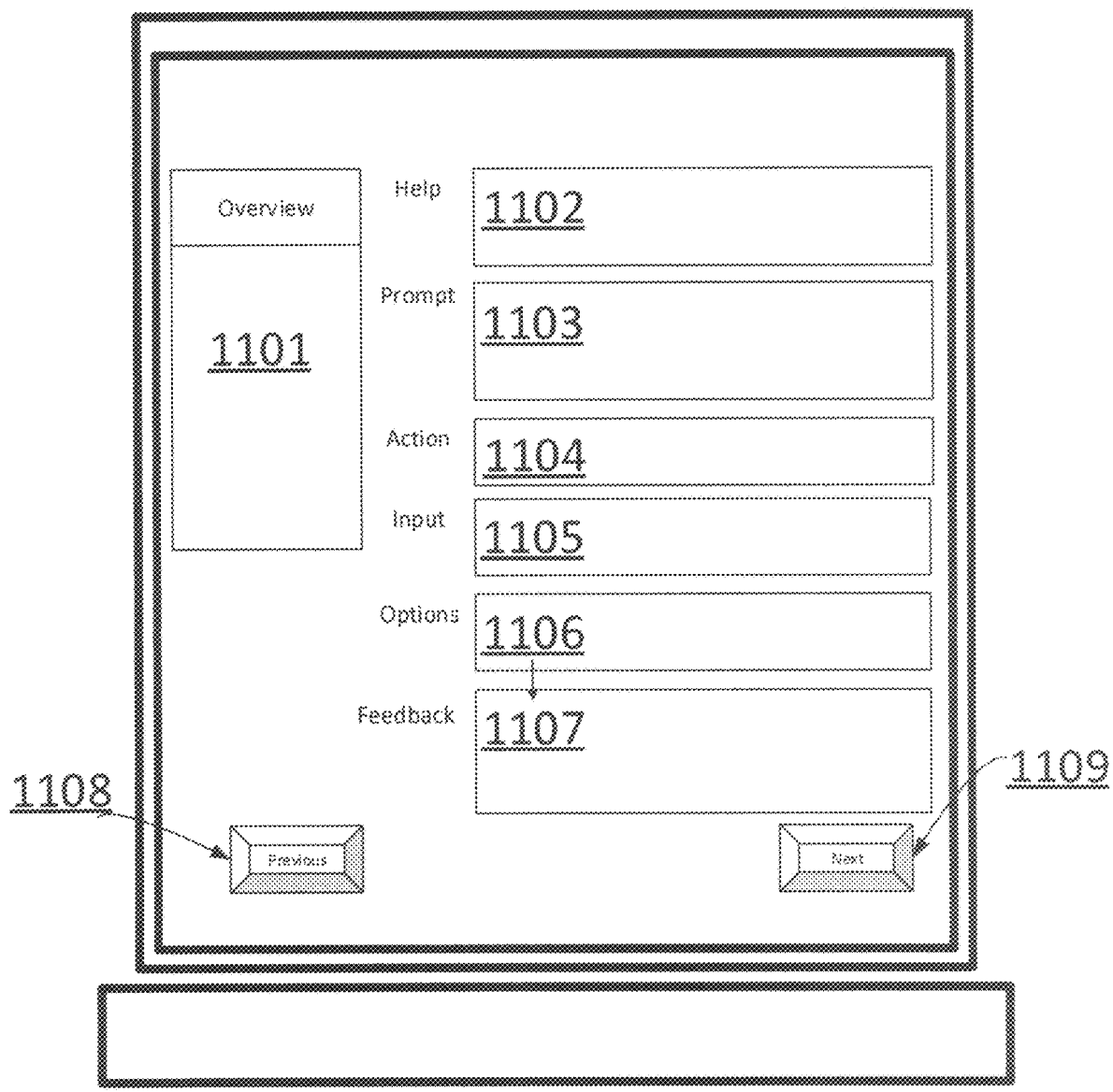
FIG. 11 illustrates a first embodiment of the user interface for the WMS of the present invention.

FIG. 11 illustrates the user interface for the WMS.

The purpose of the overview window 1101 is to display the list of prompts that comprise a questionnaire. The purpose of the help window 1102 is to display contextual information that helps the user respond to the prompt. The purpose of the prompt window 1103 is to display the prompt to which the user should respond. The purpose of the action window 1104 is to display the specific actions that the user must execute to respond to the prompt. The purpose of the input window 1105 is to enable the user to enter a response to the prompt. The purpose of the options window 1106 is to enable the user to select an option if the prompt has a number of optional responses. The purpose of the feedback window 1107 is to enable the user to input additional feedback from the interviewee. The purpose of the previous button 1108 is to enable the user to return to the previous prompt in the questionnaire. The purpose of the next button 1109 is to enable the user to proceed to the next prompt in the questionnaire.

The WMS 211 has a plurality of commands that the system administrator user can use to create a workflow. These commands include open, save, close, exit, search, setup, display, clear, input, write, bookmark and branch. The manufacturer of the WMS can use one of a plurality computer programming languages to implement these commands, such as java, javascript, PHP, HTML, C, C+, and visual basic.

The open command enables the workflow to open a questionnaire.

The save command enables the workflow to save a questionnaire.

The close command enables the WMS to close a questionnaire.

The exit command enables the user to exit the WMS.

The search command enables the user to search for a questionnaire.

The setup command enables the WMS to setup the user interface in FIG. 11. It specifies a plurality of requirements, such as the number of windows to display and their location on the screen.

The display command enables the WMS to display information in a window, such as the help window. This information is predetermined by the system administrator user when that system administrator user configures that display command in the workflow.

The clear command enables the WMS to clear all information displayed in the window specified in the clear command, including the help window and the input window.

The input command pauses the execution of the workflow until the user clicks the enter button. It enables the user to input information into the input window (then click the enter button), click a prompt in the overview window or click a button on the toolbar.

The write command enables the WMS to write information from a source location to a destination location. For each write command, the system administrator user specifies the source location and the destination location when that system administrator user configures that write command in the workflow. For example, the system administrator user may specify the source location as the input window and the destination location as a bookmark in order for a write command to write the user's input from the input window to that bookmark in an interview summary document.

When the user clicks a prompt hyperlink in the overview window, the WMS will jump to the corresponding prompt in the questionnaire.

The position command enables the WMS to re-position the cursor to a predetermined window in the user interface.

The branch command enables the WMS to jump to a pre-determined command in the workflow. For example, the system administrator user may include in the workflow a display command that displays the following instruction "Would you like to save the questionnaire (Yes/No)?". This display command in the workflow may be followed by an input command. The user can input, into the input window, "yes" or "no" then click the enter button on the screen. The system administrator user will have configured the subsequent branch command to check the information in the input window. If the user's input is "no" then the workflow will go to the exit command. If the user's input is "yes" then the workflow will go to the save command that will save the questionnaire.

Figure 12:
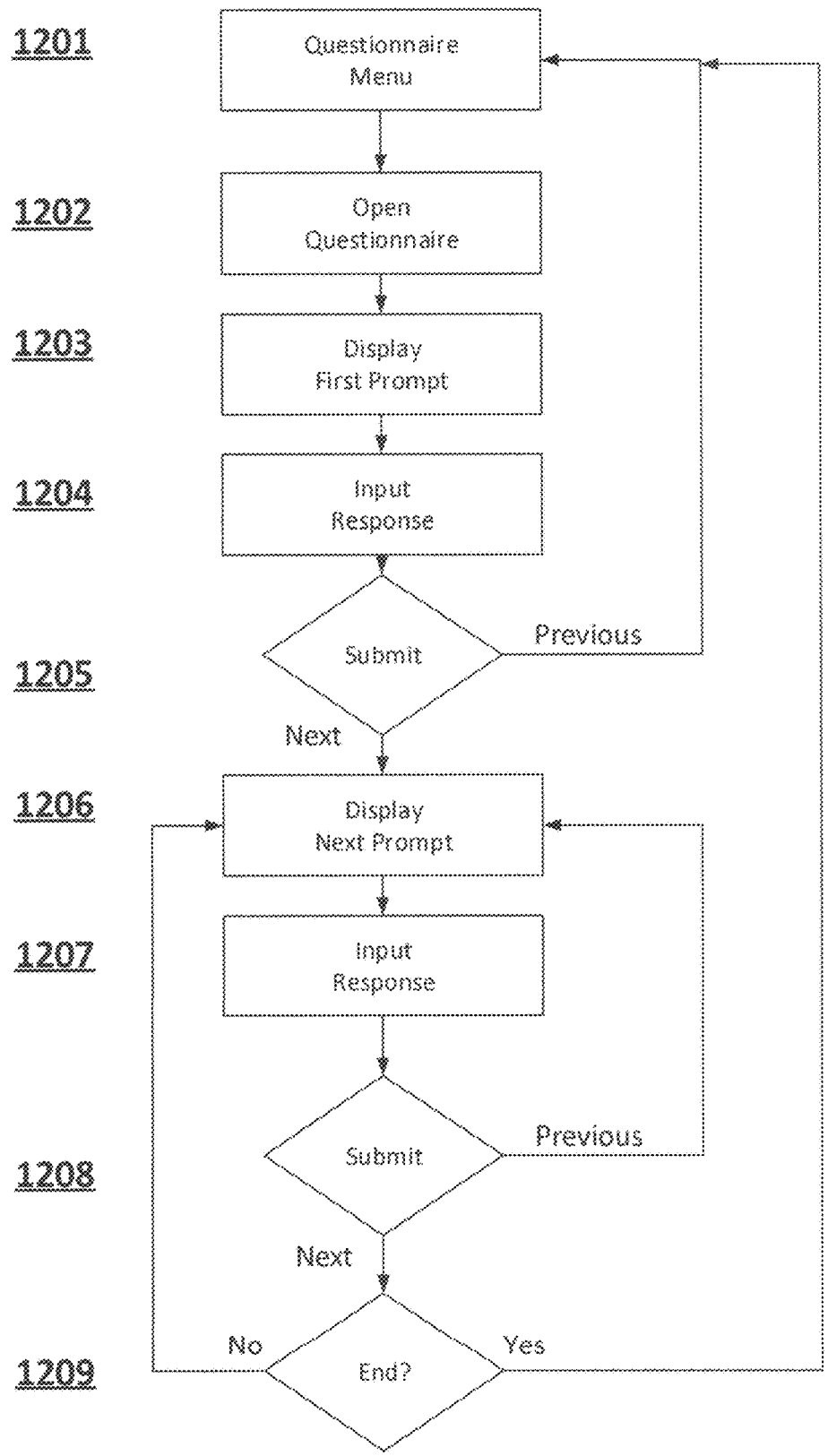
FIG. 12 illustrates a first embodiment of the workflow for the WMS of the present invention.

FIG. 12 illustrates the first embodiment of the Workflow Management System ("WMS"). This workflow is a computer program created using the commands available in the WMS. The user logs into the WMS then selects a Questionnaire. The WMS launches the workflow that is illustrated in FIG. 12.

The WMS executes the "setup" command to display the questionnaires menu 1201 comprised of a list of questionnaires that the interviewer has assigned to the interview. After the user selects a questionnaire to execute, the WMS executes an "open" command that opens the selected questionnaire.

After the WMS opens the selected questionnaire, the WMS executes another "setup" command to configure the windows that comprise the user interface illustrated in FIG. 8. The WMS then executes an "open" command to open the selected questionnaire 1202.

The WMS then executes a "display" command to display a first prompt 1203. The WMS also executes other display commands to display instructions in the other windows in the user interface FIG. 8, such as in the help window.

The WMS then executes an "input" command 1204 then waits for an input from the user. The WMS enables the user to enter a response into the input window.

After the user clicks the "next" button on the user interface, the WMS executes a write command to transfer the user's response from the input window to the WMS database 610. If the user clicks the "previous" button, the WMS will return to the questionnaire menu 1201 that lists the questionnaires that the interviewer has assigned to the interview. If the user clicked the "next" button at step 1205, the WMS will execute a display command to display the next prompt 1206. The WMS also executes other display commands to display instructions in the other windows in the user interface FIG. 11, such as in the help window.

The WMS then executes an "input" command 1207 then waits fro an input from the user. The WMS enables the user to enter a response into the input window. After the user clicks the "next" button on the user interface, the WMS executes a write command to transfer the user's response from the input window to the WMS database then the WMS will execute a branch command 1208. If the user clicks the "previous" button the WMS will re-execute the previous display command and display the previous prompt in the questionnaire 1206. If the user clicks the "next" button, the WMS will execute another branch command to determine whether the previous prompt was the last prompt in the questionnaire 1209. If the previous prompt was not the last prompt in the questionnaire then the WMS will execute a display command to display the next prompt in the questionnaire 1206. The WMS also executes other display commands to display instructions in the other windows in the user interface FIG. 8, such as in the help window. If the previous prompt was the last prompt in the questionnaire then the WMS will return to the questionnaire menu.

Figure 13:
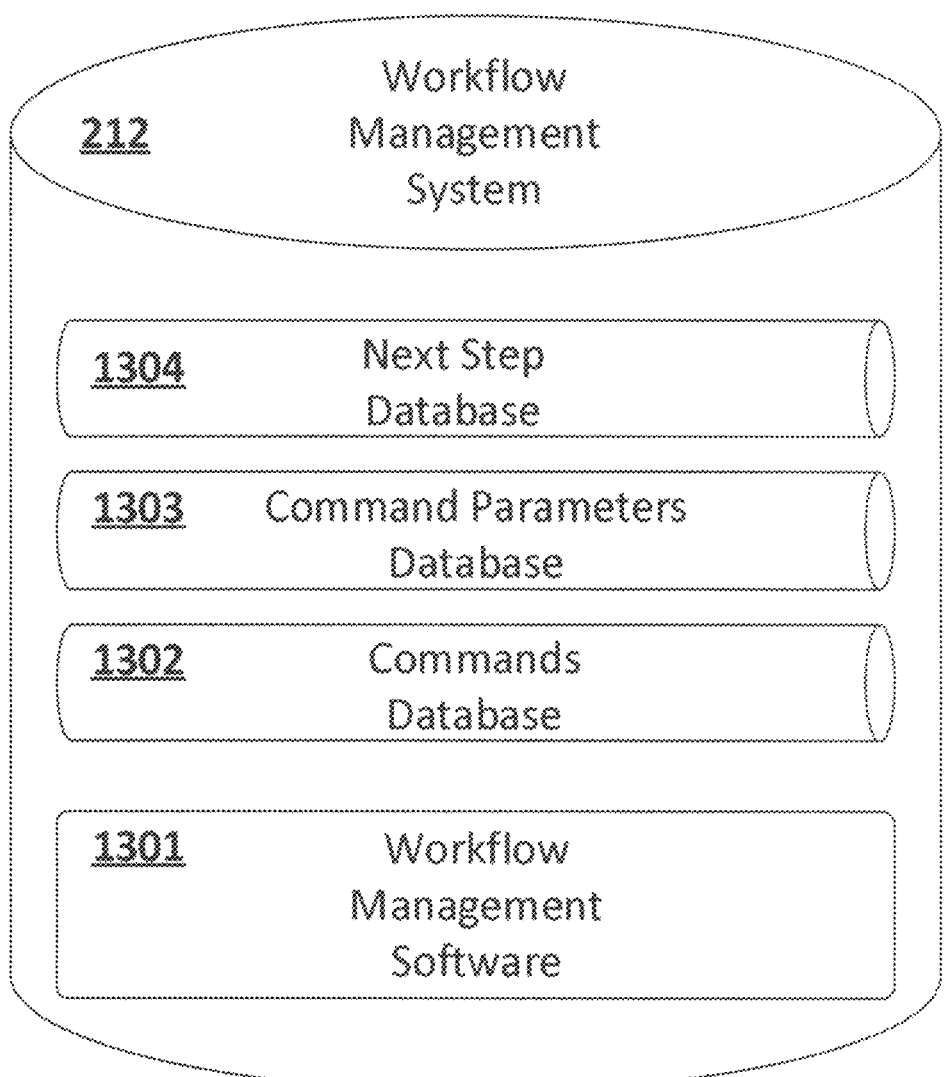
FIG. 13 illustrates a first embodiment of the key components of the WMS of the present invention.

FIG. 13 illustrates the architecture of the WMS. The WMS is comprised of a number of key components including the workflow management software 1301, the commands database 1302, the command parameters database 1303, and the next step database 1304.

The WMS vendor develops and maintains the WMS software 1301. The software can be written in any one of a plurality of programming languages including java, javascript, PHP, HTML, C, C+, and visual basic. The WMS software implements a plurality of functionality including the functionality offered by each of the WMS commands.

The commands database 1302 stores information about the WMS commands. This database includes a plurality of fields including a unique reference key for each record and the name of the command.

The WMS stores, in the command parameters database 1303, parameters associated with each command in the workflow. For example, one "display" command in the workflow may include the following text parameter "Wait . . . ". Similarly, another "display" command in the workflow may include a prompt to which the interviewee should respond. This command parameters database includes a plurality of fields including a unique reference key for each record, the unique reference key for the command and at least one parameters field.

The WMS stores sequencing information in the next step database 1304. Each step in the workflow is a command and has a unique sequence number. In the next step database, the WMS links the sequence number of each command in the workflow with the sequence number of the next command in the workflow. For a "branch" command, the next step database has one entry for each branch. For example, if a "branch" command has two options (for example "yes" and "no"), that branch command will have two potential next steps and therefore two next step entries in the next step database. If the system administrator user configures a branch command with five options then that branch command will have five next step entries in the next step database. The next step database includes a plurality of fields including a unique reference key for each record, the sequence number of the current step and the sequence number of the next step.

FIG. 14 illustrates the user interface as seen by the prompt editor user when creating and editing a prompt in the WMS. This may be the System Administrator for default prompts or an organizational worker, such as the HR Manager or an interviewer for an organization.

The prompt editor toolbar includes a number of buttons including the save button 1401 and the cancel button 1402. The save button enables the prompt editor user to save a prompt. The cancel button enables the prompt editor user to cancel changes to a prompt.

The prompt editor interface includes a number of input fields in which the prompt editor user can enter prompt data and its corresponding meta data. The purpose of the help field 1403 is to display, in the help window 1102, the contextual information that helps the user respond to the prompt.

The purpose of the prompt field 1404 is to display, in the prompt window 1103, the prompt to which the user should respond. The purpose of the action field 1405 is to display, in the action window 1104, the specific actions that the user must execute to respond to the prompt. The purpose of the multiple choice field 1406 is to indicate whether the current prompt is multiple choice or not. The purpose of the input default field 1406 is to display, in the input window 1105, the default response to the prompt. The user can accept the default or enter an alternative response. If the current prompt is a multiple choice prompt then the editor user can add, edit and delete input prompts. For example, if a multiple choice prompt has five options then there will be five input default windows. The purpose of the add button 1408 is to enable the editor user to add an input default for an additional option to be added to a multiple choice prompt. The purpose of the delete button 1409 is to enable the editor user to delete an input default option for a multiple choice prompt. The purpose of the next question field 1410 is to enable the editor user to specify the next prompt in sequence within a questionnaire after the present prompt. The purpose of the category field 1411 is to enable the editor user to specify one or more categories for the present prompt, such as a skill if the present prompt is an interview question. The purpose of the time-to-respond field 1412 is to enable the editor user to specify the expected time for the user to read the prompt and respond. The purpose of the role field 1413 is to enable the editor user to specify one or more roles for the present prompt, such as one or more job roles if the prompt is an interview question. The purpose of the management level field 1414 is to enable the editor user to specify one or more levels for the present prompt, such as one or more management levels (e.g., executive, manager, associate) if the prompt is an interview question. The purpose of the functional field 1415 is to enable the editor user to specify one or more functions for the present prompt, such as one or more functional fields of management (e.g., departments) if the prompt is an interview question. The purpose of the industry field 1416 is to enable the editor user to specify one or more industries for the present prompt. The purpose of the other #1 field 1417 is to enable the editor user to specify one or more other meta data options for the present prompt. The purpose of the other #2 field 1418 is to enable the editor user to specify one or more other meta data options for the present prompt.

The purpose of the weight field 1419 is to enable the editor user to specify a weight or priority for the present prompt. The present invention uses the weight when prioritizing questions in a questionnaire and when scoring the responses to questions. The purpose of the availability start date 1420 is to enable the editor user to specify a date when the prompt will be made available for use by the WMS. The purpose of the availability end date 1421 is to enable the editor user to specify a date when the prompt will be made unavailable for use the WMS.

Figure 15:
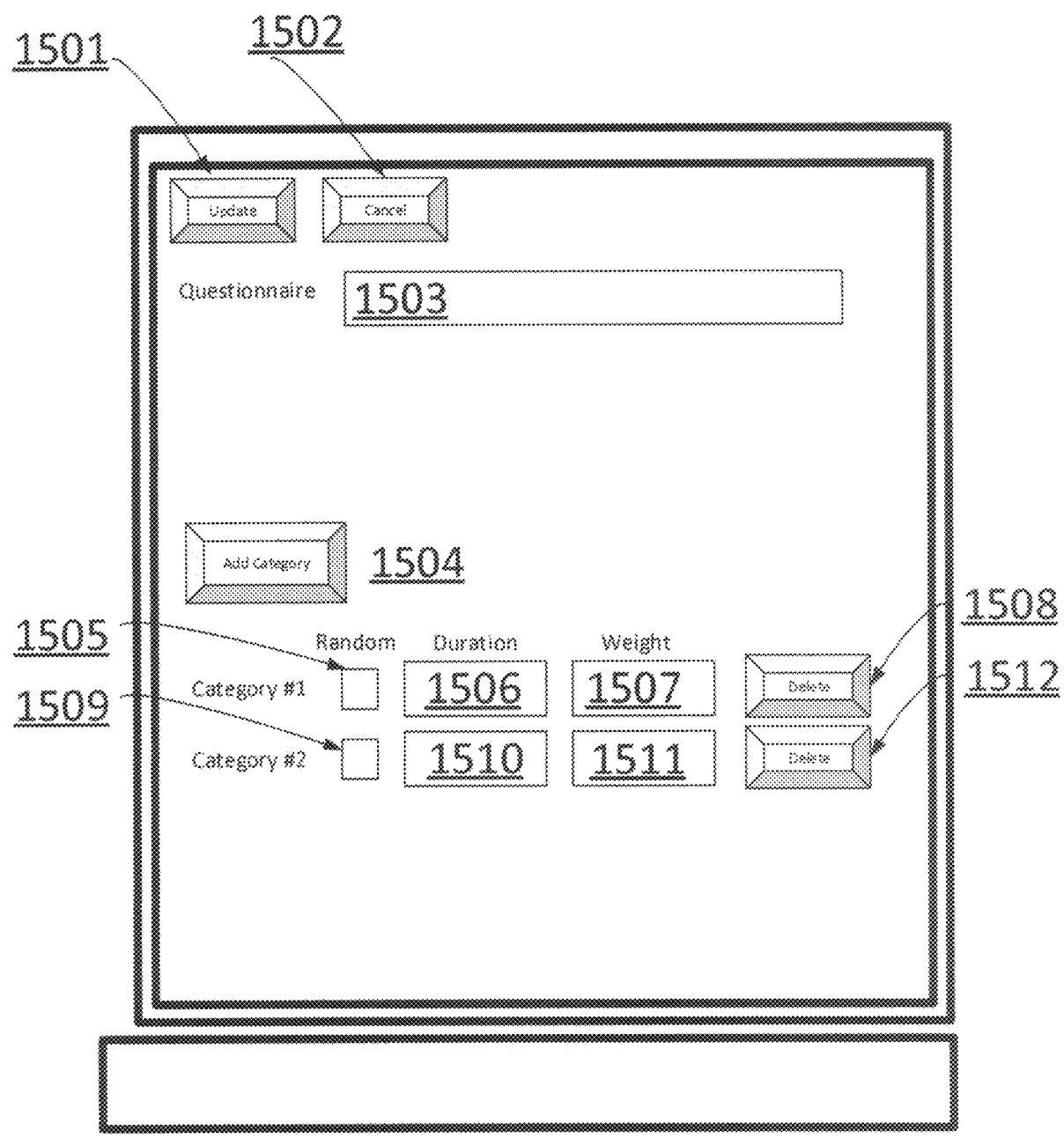
FIG. 15 illustrates a first embodiment of the Questionnaire interface for the WMS of the present invention.

FIG. 15 illustrates the user interface seen by the questionnaire editor user when creating and editing a questionnaire in the WMS. This may be the System Administrator for default questionnaires or an organizational worker, such as the HR Manager or an interviewer for an organization.

The questionnaire editor toolbar includes a number of buttons including the update button 1501 and the cancel button 1502. The update button enables the questionnaire editor user to update a questionnaire. The cancel button enables the questionnaire editor user to cancel changes to a questionnaire.

The purpose of the questionnaire field 1503 is to enable the questionnaire editor user to provide or edit the name of a questionnaire. Each questionnaire is comprised of a number of categories and each category is comprised of a number of prompts.

The purpose of the add category button 1504 is to enable the questionnaire editor user to add a category to the present questionnaire. The first random check box 1505 enables the questionnaire editor user to specify whether the prompts that will be displayed for a first category will be sequenced in a random order or in the order specified by the next step field for each prompt. The first duration field 1506 enables the questionnaire editor user to specify the amount of time to allocate for the first category. For example, if the present questionnaire is for a job interview then the questionnaire editor user can specify that the questions for a specific skill such as leadership (e.g., category #1) should have a duration of 10 minutes say in a 60 minute interview. The WMS uses the time-to-respond 1412 for each prompt to determine how many leadership questions can be read and answered in ten minutes. The first weight field 1507 enables the questionnaire editor user to specify the first weight to use when calculating the score for the first category. The first delete button 1508 enables the questionnaire editor user to delete the first category from the present questionnaire.

The second random check box 1509 enables the questionnaire editor user to specify whether the prompts that will be displayed for a second category will be sequenced in a random order or in the order specified by the next step field for each prompt. The second duration field 1510 enables the questionnaire editor user to specify the amount of time to allocate for the second category. For example, if the present questionnaire is for a job interview then the questionnaire editor user can specify that the questions for a specific skill such as communications (e.g., category #2) should have a duration of 15 minutes say in a 60 minute interview. The WMS uses the time-to-respond 1412 for each prompt to determine how many communications questions can be read and answered in ten minutes. The second weight field 1511 enables the questionnaire editor user to specify the second weight to use when calculating the score for the second category. The second delete button 1512 enables the questionnaire editor user to delete the second category from the present questionnaire.

The operator of the present invention manages a number of parameters. This list of parameters include a default list of categories, questions and questionnaires. It also includes a default list of meta data including roles, management level, function, industries and the range of weight values. For each client organization, a interview editor user can add, edit and delete these default values to configure the present invention to better meet the needs of their organization.

Figure 16:
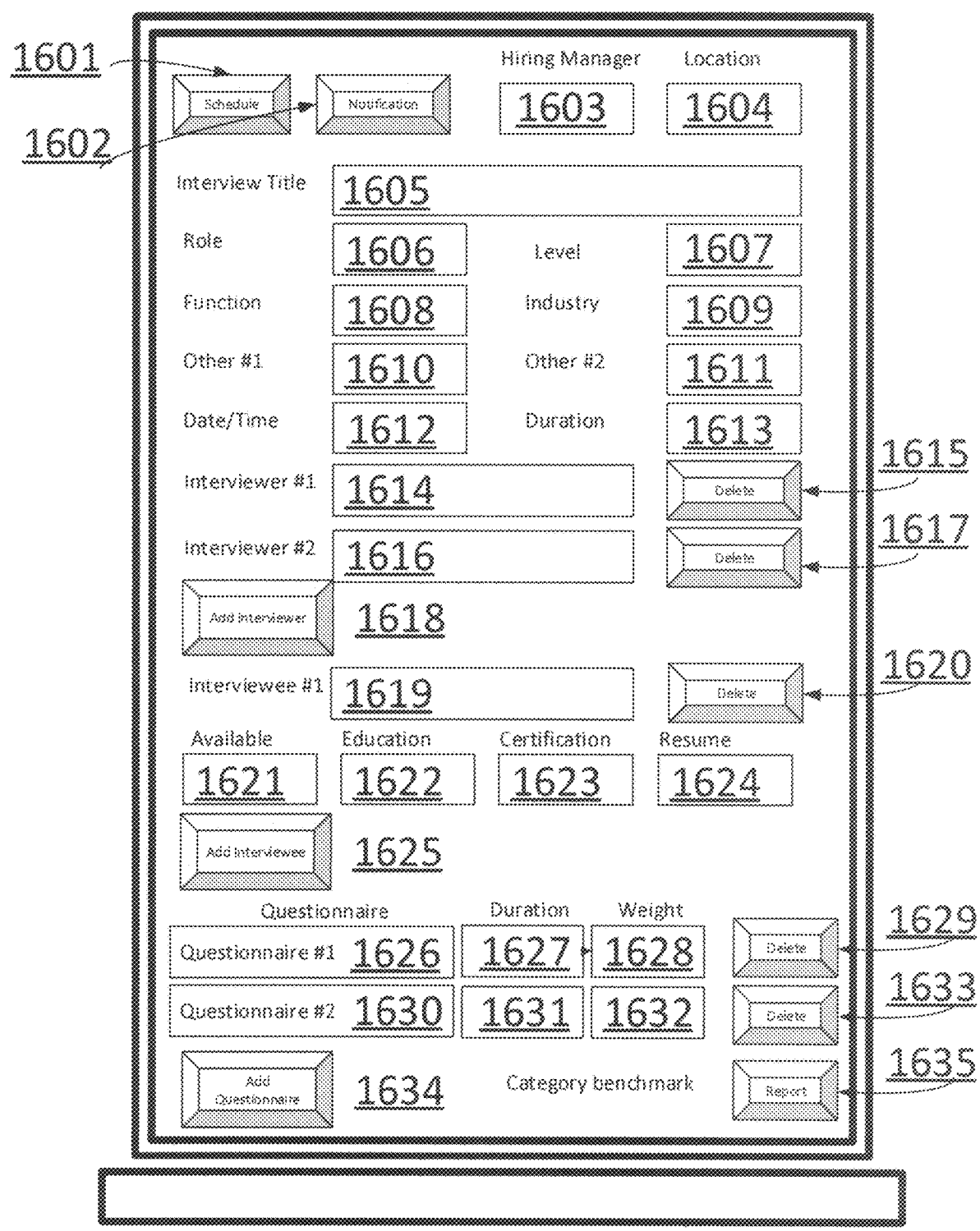
FIG. 16 illustrates a first embodiment of the activity interface for the present invention.

FIG. 16 illustrates the user interface seen by the interview editor user when creating and editing an activity, such as an interview.

The interview editor toolbar includes a number of buttons including the schedule button 1601 and the notification button 1602. The schedule button enables the interview editor user to schedule an activity, such as an interview. The notification button enables the interview editor user to notify participants about the activity, such as notifying interviewers and interviewees about a scheduled interview.

The purpose of the hiring manager field 1603 is to enable the interview editor user to provide or edit the name of the hiring manager.

The purpose of the location field 1604 is to enable the interview editor user to provide or edit the location for the job.

The purpose of the interview title field 1605 is to enable the interview editor user to provide or edit the name of an activity. Each activity is comprised of a number of questionnaires which are comprised of a number of categories and each category is comprised of a number of prompts.

The purpose of the meta data fields is to enable the interview editor user to filter the prompts that should be presented in the activity, for example the questions that should be included in an interview. The role prompt 1606 enables the interview editor user to specify the roles that apply to the present activity. Only prompts that have matching roles 1413 are eligible to be included in the present activity. The level prompt 1607 enables the interview editor user to specify the management levels that apply to the present activity. Only prompts that have matching management levels 1414 are eligible to be included in the present activity. The function prompt 1608 enables the interview editor user to specify the functional fields of management (e.g., departments) that apply to the present activity. Only prompts that have matching functional fields of management 1415 are eligible to be included in the present activity. The industry prompt 1609 enables the interview editor user to specify the industries that apply to the present activity. Only prompts that have matching industry fields 1416 are eligible to be included in the present activity. The other #1 prompt 1610 enables the interview editor user to specify other meta data that apply to the present activity. Only prompts that have matching other meta data 1417 are eligible to be including in the present activity. The other #2 prompt 1611 enables the interview editor user to specify other meta data that apply to the present activity. Only prompts that have matching other meta data 1418 are eligible to be including in the present activity. The date/time field 1612 enables the interview editor user to specify the scheduled date and time for the present activity. The duration field 1613 enables the interview editor user to specify the duration for the present activity, such as a 60 minute interview. The interviewer #1 field 1614 enables the interview editor user to specify a first interviewer to participate in the present activity, such as a 60 minute interview. The first delete button 1615 enables the interview editor user to delete interviewer #1. The interviewer #2 field 1616 enables the interview editor user to specify a second interviewer to participate in the present activity, such as a 60 minute interview. The second delete button 1617 enables the interview editor user to delete interviewer #2. The add interviewer button 1618 enables the interview editor user to add an interviewer to the activity. The interviewee #1 field 1619 enables the interview editor user to specify a first interviewee to participate in the present activity, such as a 60 minute interview. The third delete button 1620 enables the interview editor user to delete interviewee #1. The available field 1621 enables the interview editor user to specify the date when the interviewee will be available to start working. The education field 1622 enables the interview editor user to specify the interviewee's educational qualifications. The certification field 1623 enables the interview editor user to specify the interviewee's certifications. The resume field 1624 enables the interview editor user to specify the interviewee's resume. The add interviewee button 1625 enables the interview editor user to add an interviewee to the present activity. The questionnaire #1 field 1626 enables the interview editor user to specify a first questionnaire for the present activity, such as a 60 minute interview. The first duration field 1627 enables the interview editor user to specify the amount of time to allocate for the first questionnaire. The first weight field 1628 enables the interview editor user to specify the weight to use when calculating the score for the first questionnaire. The first delete button 1629 enables the interview editor user to delete the first questionnaire from the present activity. The questionnaire #2 field 1630 enables the interview editor user to specify a second questionnaire for the present activity, such as a 60 minute interview. The second duration field 1631 enables the interview editor user to specify the amount of time to allocate for the second questionnaire. The second weight field 1632 enables the interview editor user to specify the weight to use when calculating the score for the second questionnaire. The second delete button 1633 enables the interview editor user to delete the second questionnaire from the present activity. The add questionnaire button 1634 enables the interview editor user to add a questionnaire to the present activity. The report button 1635 enables the interview editor user to output a report that summarizes the present activity.

FIG. 17 illustrates the report seen by the interviewer that summarizes an activity, such as an interview.

The organization field 1701 displays the name of the client organization. The department field 1702 displays the name of the department in the client organization. The job position field 1703 displays the job position in the department for the interview. The hiring manager field 1704 displays the name of the hiring manager for the job position. The interviewers field 1705 displays the names of the interviewers. The interview date field 1706 displays the date of the interview. The interviewee field 1707 displays the names of the interviewees. The available field 1708 displays the date when the interviewee will become available. The location field 1709 displays the primary location for the job position. The resume field 1710 displays a link to the interviewee's resume. The education field 1711 displays the interviewee's education. The certification field 1712 displays the interviewee's certifications.

For each category, the report displays a target score, actual score, weight and comments. For a first category, the target score field 1713 displays the benchmark score for that skill for the target job. The first actual score field 1714 displays the score for the first category as calculated by the present invention. The first weight field 1715 displays the weight for the first category. The first comments field 1716 displays the weight for the first category.

For a second category, the target score field 1717 displays the benchmark score for that skill for the target job. The second actual score field 1718 displays the score for the second category as calculated by the present invention. The second weight field 1719 displays the weight for the second category. The second comments field 1720 displays the weight for the second category. For a third category, the target score field 1721 displays the benchmark score for that skill for the target job. The third actual score field 1722 displays the score for the third category as calculated by the present invention. The third weight field 1723 displays the weight for the third category. The third comments field 1724 displays the weight for the third category. The number of categories in the report will reflect the number of categories selected in the questionnaires by the interviewers. The present invention will calculate a total score for the interview. This score is calculated using the interviewee's grade for each response to a prompt by the interviewee, the weight for each prompt, the weight for each category and the weight for each questionnaire. The result is a total target score 1725, a total actual score 1726, a total weight 1728, and overall comments 1729. The interviewer also can make a number of suggestions namely, recommend 1730 the interviewee for another position, on board 1731 the interviewee, suggest additional follow up 1732 with the interviewee or pass 1733 the interviewee.

Preferred Embodiment of the Present Invention

Figure 18:
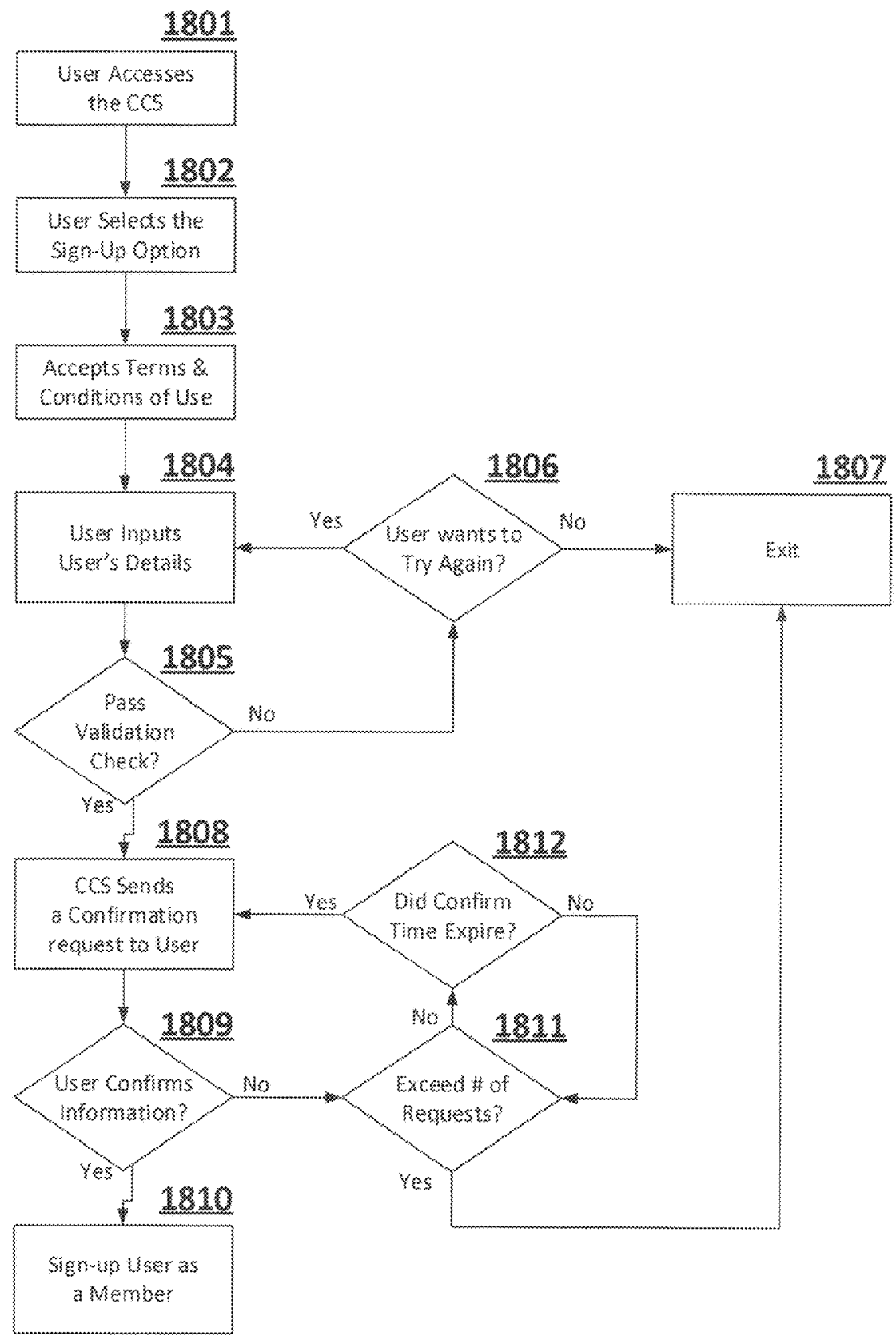
FIG. 18 illustrates a first embodiment of the sign-up procedure for the present invention.
Figure 19:
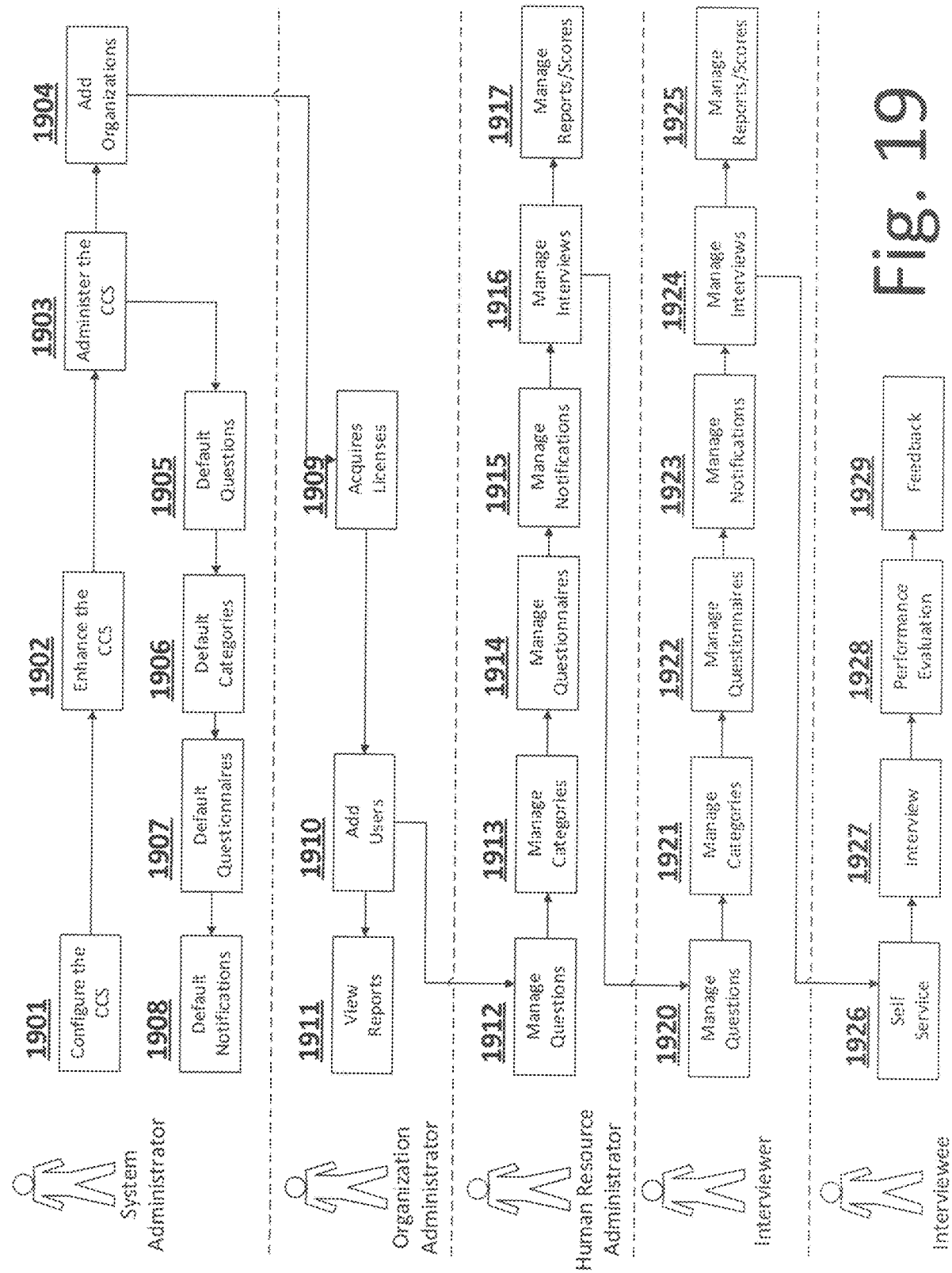
FIG. 19 illustrates an overview of the preferred embodiment of the present invention.

The preferred embodiment of the apparatus and method of the present invention is illustrated in FIG. 19. FIG. 18 illustrates the procedure for users to sign-up as members.

The present invention enables users to sign-up as members by following the procedure illustrated in FIG. 18. The user accesses the CCS 1801 then selects the sign-up option 1802. The user then accepts the predetermined terms and conditions of use 1803. The user then inputs the requested user details 1804. These details include name, contact information, user name, password and the other meta data specified above for the user database illustrated in FIG. 6. When the user accesses the CSS after signing up as a member, that user will have to input the user name and password to log into the CCS. The CCS checks the information entered by the user at step 1804 for completeness. If the information is incomplete 1805, the CCS will offer the user the opportunity to complete the information 1806. If the user chooses to try again to complete the information, the CCS returns to step 1804. If the user chooses not to complete the sign up information, the CCS exits the sign-up procedure 1807.

If the information entered by the user is complete 1805, the CCS sends a confirmation request to the user 1808. The CCS will send this confirmation request to the email address entered by the user at step 1804. The CCS asks the user to confirm receipt of this request 1809. If the user confirms receipt of the confirmation request as requested by the CCS, the CCS will sign-up the user as a member 1810. If the user does not confirm receipt of the confirmation request, the CCS will determine whether the predetermined maximum number of reminder requests have been exceeded 1811. If the CCS has already sent the predetermined maximum number of confirmation requests, then the CCS will exit the sign-up procedure 1807. If the CCS has sent fewer than the predetermined maximum number of confirmation requests, then the CCS will determine whether the predetermined wait time has been exceeded 1812 before sending another confirmation request to the user. When the predetermined wait time between reminders has been exceeded 1812, the CCS will send another confirmation request to the user 1808. This will return the CCS to step 1808 in the sign-up procedure.

FIG. 19 illustrates a high level summary of the preferred embodiment of the present invention. The system administrator user logs into the CCS FIG. 18 and configures parameters in the CCS .901, such as pricing for licenses. The CCS, including its administration system, is the means to configure these parameters. The system administrator user also enhances the CCS 1902 as new features are requested by users and implemented by the system administrator. The CCS is created using standard programming languages such as java, javascript, PHP, HTML, C, C+, and visual basic which is the moans to enhance the CCS. The system administrator user administers the CCS 1903. The CCS can be hosted by a web host such as Godaddy or Host Gator. These web hosts are the means for the system administrator to administer the CCS. They offer a plurality of services such as backing up the databases, managing content pages using tools like Wordpress, and providing forum services. For example, GoDaddy enables clients to add forums to their website that lets web visitors create discussions and post comments in discussion threads. The CCS is also the means for the system administrator to add organizations 1904 that want to use the present invention. The CCS is operatively coupled to the WMS 211 which is the means for the system administrator t. add, edit and delete default questions 1905, default categories 1906, and default questionnaires 1907. The CCS is operatively coupled to the notification management system 209 which is the means for the system administrator to add, edit and delete default notifications 1908.

After the system administrator adds an organization 1904, a predetermined notification is sent to the organization administrator. The CCS, including its administration system, is the means to add an organization. The system administrator enters the contact information for the organization administrator into the notification management system 209 which is the means to send the notification. The organization administrator logs into the CCS FIG. 18 then acquires licensee 1909 to use the present invention. The CCS is the means for the organization administrator to acquire licenses. The CCS is also the means for the organization administrator to add users 1910 from the organization administrators organization. The CCS is operatively coupled to the business intelligence system 209 that is the means to add, edit, delete and view reports 1911.

The human resource administrator user logs into the CCS FIG. 18. The CCS is operatively coupled to the WMS 211 which is the means for the human resource administrator to add, edit and delete questions 1912, categories 1913, questionnaires 1914, and interviews 1916. The notification management system 209 is the means for the HR Manager to add, edit, delete and send notifications 1915. The CCS is operatively coupled to the business intelligence system 208 which is the means for the HR Manager to manage reports and scoring 1917.

The interviewer user logs into the CCS FIG. 18. The CCS is operatively coupled to the WMS 211 which is the means for the interviewer user to add, edit and delete questions 1920, categories 1921, questionnaires 1922, and interviews 1924. The notification management system 209 is the means for the interviewer to add, edit, delete and send notifications 1923. The CCS is operatively coupled to the business intelligence system 208 which is the means for the interviewer to manage reports and scoring 1925.

The interviewee user, or prospect who may not be actively looking for a job, logs into the CCS FIG. 18. The CCS is operatively coupled to the WMS 211 which is the means for the interviewee user or prospect to execute questionnaires, including questionnaires comprised of multiple choice questions that can be scored automatically to facilitate a self-service interview 1926 The prospect may log into the CCS to use a forum that is unrelated to a job search. Rather, the goal of the forum is to identify the prospect's interests, aspirations and goals. This helps organizations determine how to reach prospects and better position their job opportunities. The WMS is also the means for an interviewer to interview an interviewee 1927. If the interviewee is on boarded, the WMS is also the means for an organization worker to interview the on boarded interviewee to evaluate the performance 1928 of the on boarded interviewee. The WMS is also the means for the on boarded interviewee to submit feedback on the overall hiring and onboarding process.

The actual performance of the on boarded interviewee and the corresponding reports and scores observed by interviewers 1925, human resource administrators 1917 and generated by that interviewee's self-service interview 1911 are compared to improve prompts, categories, questionnaires, weights, interviews and scoring. The business intelligence system 208 and the data storage system 207 are the means to do this by identifying trends, patterns and relationships that may be hidden in the data stored in the data storage system then recommending improvements. Example trends include the types of interviewees, including their skills and qualifications, who are applying for jobs and how this is changing over time. These trends can have a plurality of drivers, such as the release of a new technology, adoption of new management techniques and introduction of new business certifications. An example of a pattern is the increase in job applications with the business cycle that coincides with monthly, quarterly and annual business drivers as well as longer term economic cycles. An example of a relationship is that a certain combination of scores for a certain set of skills usually to lead to better or worse actual performance after an interviewee is on boarded. One or more organization workers will use the business intelligence system to apply standard analysis techniques, such as regression analysis and other statistical analysis techniques such as decision learning, decision graphs and decision support, to identify relationships between interview scores for specific skills and actual performance for specific jobs. Organization workers will then adjust their job-specific benchmark skill scores to match those of the higher performing interviewees who have on boarded. For each organization, their benchmark skill scores will be optimized over time as they capture more performance data. This feedback mechanism will improve the candidate selection criteria for organizations and improve the average performance of their on boarded interviewees. Regression analysis and other applicable statistical analysis techniques such as decision learning, decision graphs and decision support are taught in the following disclosures U.S. Pat. No. 8,429,101 B2, U.S. Pat. No. 7,233,931 B2, U.S. Pat. No. 7,660,705 B1, U.S. Pat. No. 7,562,063 B1, U.S. Pat. No. 8,015,142 B1 and U.S. Pat. No. 7,853,550 B1. The input learning data is comprised of the candidate's interview scores, the scores for the candidate's actual job performance and the present benchmark scores for the job. The hierarchical decision set output from the decision learning system is the updated benchmark scores for a given job in a specific department. These updated benchmark scores will lead to better decision making during the hiring process which will lead to higher performing on boarded workers. The business intelligence system 208 and data storage system 208 are the means to enable the decision learning tools used by the present invention, such as those taught in the aforementioned disclosures.

The document management system 212 is operatively coupled to the WMS 211. The document management system is the means to manage documents such as resumes and interview summaries.

The payment processor system 213 is operatively coupled to the WMS 211. The payment processor system is the means for organizations to pay for access to the present invention.

The present invention has a plurality of potential revenue streams including licensing fees, advertising, and selling access to trend information generated by the business intelligence system. Payments can be made using a plurality of methods including credit cards, debit cards, electronic funds transfer, digital cash, checks and barter. In addition, a plurality of options exist for the timing of payments including annual and monthly license payments in advance. It will be evident to one skilled in the art that one or more of the steps in the preferred method can be eliminated in specific situations without affecting the usefulness of the present invention.

Anyone skilled in the art will recognize that the method and apparatus of the present invention has many applications and advantages, and that the present invention is not limited to the representative examples and variations disclosed herein. In addition, the scope of the present invention covers conventional variations and modifications, to the components of the present invention, which are known to those who are skilled in the art.

I claim:

1. A method comprising:
   receiving, via a central control system, a first set of benchmark skills scores from a first user terminal associated with a first user;
   displaying, a plurality of skills questionnaires on a second user terminal via a workflow management system that is operatively coupled to said central control system, wherein a first questionnaire among the plurality of skills questionnaires is integrated with a third-party forum and, wherein said third-party forum is linked to a forums database in an administration system, which is operatively coupled to said central control system;
   receiving a plurality of information, including a plurality of skills answers, from said third-party forum, in response to a second user triggering a first notification event by executing said first questionnaire on said third-party forum;
   calculating, by said central control system, a first individual skills score for each of said plurality of skills answers in said first questionnaire and determining whether to proceed with a second questionnaire in said plurality of skills questionnaires;
   transmitting a first plurality of notification data, to a secure email address of said second user via a virtual private network, in response to said first notification event from said third-party forum, whereby said first plurality of notification data notifies said second user of at least one interview that has been scheduled to complete said second questionnaire;
   transmitting a second plurality of notification data to a public email address of said second user, based on said transmission of said first plurality of notification data;
   determining by said central control system, a second individual skills score for each of said plurality of skills answers for all questionnaires in said plurality of skills questionnaires;
   computing by the central control system, an aggregate skills score for each of said plurality of skills for said second user, and outputting an interview summary document on a display, whereby said aggregate skills score for each of said plurality of skills and a role recommendation inform a decision whether to hire said second user;
   receiving, from a third user terminal associated with a third user via said workflow management system, a plurality of feedback about said second user's actual role performance as a plurality of actual skills scores;
   determining by a business intelligence system, operatively coupled to the central control system, at least one of a trend, a pattern and a relationship, among said aggregate skills score for each of the plurality of skills for said second user, said plurality of actual skills scores for said second user and said first set of benchmark skills scores, whereby the business intelligence system recommends at least one update to said first set of benchmark skills scores;
   receiving, from said third user terminal via the workflow management system, said at least one update to said first set of benchmark skills scores; and
   calculating by the central control system, a second set of benchmark skills scores based on said at least one update, wherein the second set of benchmark skills scores corresponds to said plurality of skills required for said second user to perform a role above a second predetermined performance level.

2. The method according to claim 1, wherein said second individual skills score is optionally one of a percentage and a score between 1 and 10.

3. The method according to claim 1, wherein the first set of benchmark skills scores corresponds to said plurality of skills required to perform said role above a first predetermined performance level.

4. The method according to claim 1, wherein the plurality of skills answers are input by one of the third user and the second user.

5. The method according to claim 3,
   wherein each of said plurality of skills questionnaires comprises a plurality of questions,
   wherein the plurality of questions are categorized based on the plurality of skills required by said second user to perform said role above said first predetermined performance level, and
   wherein each of said plurality of questions is designed to elicit an answer indicative of said second user's proficiency in said plurality of skills.

6. The method according to claim 1, wherein each said aggregate skills score is a weighted average of said second individual skills score for each of said plurality of skills answers for all questionnaires in said plurality of skills questionnaires.

7. The method according to claim 1, wherein the plurality of feedback is indicative of said second user's actual performance in each of said plurality of skills when performing said role.

8. The method according to claim 3, wherein the business intelligence system uses a plurality of analysis techniques, optionally including a regression analysis, to calculate said second set of benchmark skills scores that is more indicative of said plurality of skills required by said second user to perform said role above said second predetermined performance level based on the correlation among said actual skills scores, said aggregate skills scores and said first set of benchmark skills scores.

9. The method according to claim 3, wherein said at least one update to said first set of benchmark skills scores include replacing said first set of benchmark skills scores, as calculated by said business intelligence system before receiving said actual skills scores for said second user,. with the second set of benchmark skills scores, as calculated by said business intelligence system after receiving said actual skills scores for said second user.

10. The method according to claim 1, wherein the interview summary document includes optionally the aggregate skills score for each of the plurality of skills, at least one comment for each of a plurality of skills categories and a recommendation of said second user's suitability for said role.

11. A system comprising:
a central control system configured to receive a first set of benchmark skills scores from a first user terminal associated with a first user; and
a workflow management system, operatively coupled to the central control system, configured to:
display a plurality of skills questionnaires on a second user terminal, wherein a first questionnaire among the plurality of skills questionnaires is integrated with a third-party forum and, wherein said third-party forum is linked to a forums database in an administration system, which is operatively coupled to said central control system;
receive a plurality of information, including a plurality of skills answers, from said third-party forum, in response to a second user triggering a first notification event by executing said first questionnaire on said third-party forum;
calculate, by said central control system, a first individual skills score for each of said plurality of skills answers in said first questionnaire and determine whether to proceed with a second questionnaire in said plurality of skills questionnaires;
transmit a first plurality of notification data, to a secure email address of said second user via a virtual private network, in response to said first notification event from said third-party forum, whereby said first plurality of notification data notifies said second user of at least one interview that has been scheduled to complete said second questionnaire;
transmit a second plurality of notification data to a public email address of said second user, based on said transmission of said first plurality of notification data;
determine a second individual skills score for each of said plurality of skills answers for all questionnaires in said plurality of skills questionnaires;
compute an aggregate skills score for each of said plurality of skills for said second user, and output an interview summary document on a display, whereby said aggregate skills score for each of the plurality of skills and a role recommendation inform a decision whether to hire said second user;
access a third user terminal, associated with a third user, and is further configured to receive a plurality of feedback about said second user's actual role performance as a plurality of actual skills scores;
access a business intelligence system, operatively coupled to said central control system, which is further configured to determine at least one of a trend, a pattern and a relationship among said aggregate skills scores for each of said plurality of skills for said second user, said plurality of actual skills scores for said second user and said first set of benchmark skills scores, whereby the business intelligence system recommends at least one update said first set of benchmark skills scores;
receive, from said third user terminal, said at least one update to said first set of benchmark skills scores; and
calculate a second set of benchmark skills scores based on said at least one update, wherein the second set of benchmark skills scores corresponds to said plurality of skills required for said second user to perform a role above a second predetermined performance level.

12. The system according to claim 11, configured to receive said second individual skills score that is optionally one of a percentage and a score between 1 and 10.

13. The system according to claim 11, wherein the first set of benchmark skills scores corresponds to said plurality of skills required to perform said role above a first predetermined performance level.

14. The system according to claim 11, wherein the workflow Management System is configured to receiver said plurality of skills answers that are input by one of said third user and said second user.

15. The system according to claim 13, configured to display each of said plurality of skills questionnaires, each comprising a plurality of questions,
wherein said plurality of questions are categorized based on said plurality of skills required by said second user to perform said role above said first predetermined performance level, and
wherein each of said plurality of questions is designed to elicit an answer indicative of said second user's proficiency in said plurality of skills.

16. The system according to claim 11, wherein said central control system is further configured to calculate said aggregate skills score as a weighted average of said second individual skills score for each of said plurality of skills answers for all questionnaires in said plurality of skills questionnaires.

17. The system according to claim 11, configured to receive a plurality of feedback that is indicative of said second user's actual performance in each of said plurality of skills when performing said role.

18. The system according to claim 13, wherein said business intelligence system is further configured to use a plurality of analysis techniques, optionally including a regression analysis, to calculate said second set of benchmark skills scores that is more indicative of said plurality of skills required by said second user to perform said role above said second predetermined performance level based on the correlation among said actual skills scores, said aggregate skills scores and said first set of benchmark skills scores.

19. The system according to claim 13, configured to receive said at least one update to said first set of benchmark skills scores and replace said first set of benchmark skills scores, as calculated by said business intelligence system before receiving said actual skills scores for said second user, with the second set of benchmark skills scores, as calculated by said business intelligence system after receiving said actual skills scores for said second user.

20. The system according to claim 11, wherein the third user terminal is configured to display the interview summary document optionally including the aggregate skills score for each of the plurality of skills, at least one comment for each of a plurality of skills categories and a recommendation of said second user's suitability for said role.

* * * * *